United States Patent
Yoshikawa et al.

(10) Patent No.: US 7,911,511 B2
(45) Date of Patent: Mar. 22, 2011

(54) IMAGING DEVICE, DISPLAY CONTROL DEVICE, DISPLAY DEVICE, PRINTING CONTROL DEVICE, AND PRINTING DEVICE

(75) Inventors: Motonobu Yoshikawa, Osaka (JP); Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 11/915,188

(22) PCT Filed: Feb. 6, 2006

(86) PCT No.: PCT/JP2006/301974
§ 371 (c)(1),
(2), (4) Date: Nov. 21, 2007

(87) PCT Pub. No.: WO2006/126309
PCT Pub. Date: Nov. 30, 2006

(65) Prior Publication Data
US 2009/0102931 A1    Apr. 23, 2009

(30) Foreign Application Priority Data
May 25, 2005    (JP) .................................. 2005-151912

(51) Int. Cl.
H04N 5/76 (2006.01)
H04N 3/14 (2006.01)

(52) U.S. Cl. .............................. 348/231.99; 348/333.05

(58) Field of Classification Search ................ 348/208.2, 348/208.4, 208.11
See application file for complete search history.

(56) References Cited

U.S. PATENT DOCUMENTS

| | | | | |
|---|---|---|---|---|
| 6,429,895 B1 * | 8/2002 | Onuki | ...................... | 348/208.99 |
| 7,027,087 B2 * | 4/2006 | Nozaki et al. | ............. | 348/231.99 |
| 7,113,204 B2 * | 9/2006 | Eto et al. | .................. | 348/208.99 |
| 7,408,571 B2 * | 8/2008 | Tanaka et al. | .............. | 348/207.1 |
| 7,634,180 B2 * | 12/2009 | Suzuki | ....................... | 348/208.2 |
| 2004/0165087 A1 * | 8/2004 | Harada | .......................... | 348/239 |

FOREIGN PATENT DOCUMENTS

| | | |
|---|---|---|
| JP | 8-223481 | 8/1996 |
| JP | 2001-045354 | 2/2001 |
| JP | 2002-262155 | 9/2002 |

* cited by examiner

Primary Examiner — Luong T Nguyen
(74) Attorney, Agent, or Firm — McDermott Will & Emery LLP

(57) ABSTRACT

In an imaging device, a display control device, and a display device which are operable to conveniently display reduced images in accordance with a motion and an attitude at the time of shooting, a motion detection section detects the motion of the imaging device during continuous shooting. A recording section records reduced images of the shot images obtained by the imaging device, and motion information on the motion of the imaging device corresponding to the reduced images. An image extraction section extracts a plurality of the reduced images of the consecutively shooting from among the recorded reduced images. An image display control section causes a display section to display the extracted reduced images. An image display control section arranges the extracted reduced images in accordance with the motion information and causes the display section to display the extracted reduced images.

14 Claims, 20 Drawing Sheets

| CAMERA ATTITUDE | ATTITUDE DETERMINATION SIGNAL |
|---|---|
| 0° (HORIZONTAL SHOOTING ATTITUDE) | 0 |
| 90° (VERTICAL SHOOTING ATTITUDE) | 1 |

(a)

(b)

(b)

(a)

IMAGING DEVICE, DISPLAY CONTROL DEVICE, DISPLAY DEVICE, PRINTING CONTROL DEVICE, AND PRINTING DEVICE

RELATED APPLICATIONS

This application is the U.S. National Phase under 35 U.S.C. §371 of International Application No. PCT/JP2006/301974, filed on Feb. 6, 2006, which in turn claims the benefit of Japanese Application No. 2005-151912, filed on May 25, 2005, the disclosures of which Applications are incorporated by reference herein.

TECHNICAL FIELD

The present invention relates to a display method of an image shot by an imaging device, and more particularly to an imaging device, a display control device, a display device, and a printing device which control a display method of a shot image in accordance with motion information of the imaging device.

BACKGROUND ART

In recent years, an imaging sensor such as a CCD (Charge Coupled Device) and a CMOS (Complementary Metal-Oxide Semiconductor), and a signal processing device are increasingly improved in terms of integration density and come to be available inexpensively. Accordingly, by using such an imaging sensor and a processing device, a digital still camera and a digital video camera (hereinafter referred to as a "digital camera"), which are capable of converting an optical image of an object into an electrical image signal and outputting the same are rapidly growing popular.

Many of the digital cameras have small-size display devices, and have functions of displaying the shot image one by one and displaying a list of a plurality of shot images (hereinafter referred to as a thumbnail display). Aiming for a further improved display method, a proposal has been made, for example, in which a shooting attitude of a digital camera at the time of shooting is detected and the shot image, which is either a vertically shot image or a horizontally shot image, is displayed based on the shooting attitude.
Patent Document 1: Japanese Laid-Open Patent Publication No. 2001-45354

DISCLOSURE OF THE INVENTION

Problems to be Solved by the Invention

In the case where a photographer follows and shoots a moving object such as an automobile or an airplane, the photographer performs a consecutive shooting while moving a digital camera in a horizontal, or a vertical, or a diagonal direction (hereinafter referred to as "panning"). Conventionally, in a thumbnail display, a plurality of images including images which have been consecutively shot through panning (hereinafter referred to as "panning" images) are arranged in a predetermined direction in order of a shot date and time.

It is difficult for the photographer to view a conventional thumbnail display in the case described below. Specifically, in the case where an arranging direction of the images and a moving direction of the object during the shooting do not correspond to each other, an order of actually shot scenes and that of the thumbnail display are different from each other. Further, in the case where panning images are displayed in the thumbnail display together with normally shot images or other panning images in a mixed manner, the thumbnail display is not related to the actually shot scenes.

Therefore, an object of the present invention is to provide an imaging device, a display control device, and a display device which display the panning images in the thumbnail display in accordance with a motion of an imaging device at the time of shooting, thereby enabling a convenient thumbnail display which corresponds to a motion of the object at the time of the shooting.

Solution to the Problems

An object of the present invention is attained by an imaging device having a configuration described below. An imaging device according to the present invention is operable to output an optical image of an object as an electrical image signal, and comprises:

display means for displaying an image in accordance with the image signal;

an imaging optical system for forming the optical image of the object;

imaging means for receiving the optical image which is formed by the imaging optical system and for converting the optical image into the electrical image signal;

motion detection means for detecting a motion of the imaging device during continuous shooting;

recording means for recording reduced images and motion information, the reduced images corresponding to shot images which are obtained by the imaging means, and the motion information indicating the motion of the imaging device, which has been detected by the motion detection means, for each of the reduced image; image extraction means for extracting a plurality of reduced images of consecutive shooting from among the reduced images recorded in the recording means; and image display control means for causing the display means to display the reduced images extracted by the image extraction means, wherein the image display control means arranges the reduced images extracted by the image extraction control means in accordance with the motion information causes the display means to display the reduced images.

According to the above-described configuration, at the time of a thumbnail display, the plurality of reduced images of consecutive shooting are displayed in accordance with the motion of the imaging device at the time of the shooting, whereby it is possible to provide a convenient thumbnail display which corresponds to a motion of the object at the time of the shooting.

EFFECT OF THE INVENTION

As above described, an imaging device, a display control device, a display device, a print control device, and a printing device of the present invention are operable to detect the motion of the imaging device at the time of shooting, and to record information of the detected motion together with corresponding shot images, thereby enabling the extraction of images which have been shot in a given shooting attitude. Further, when a plurality of reduced images of the consecutive shooting are to be displayed in thumbnailed form, display is performed in accordance with a motion of the imaging device at the time of the shooting, whereby it is possible to provide a convenient thumbnail display which corresponds to the motion of the object at the time of the shooting.

Figure 1:
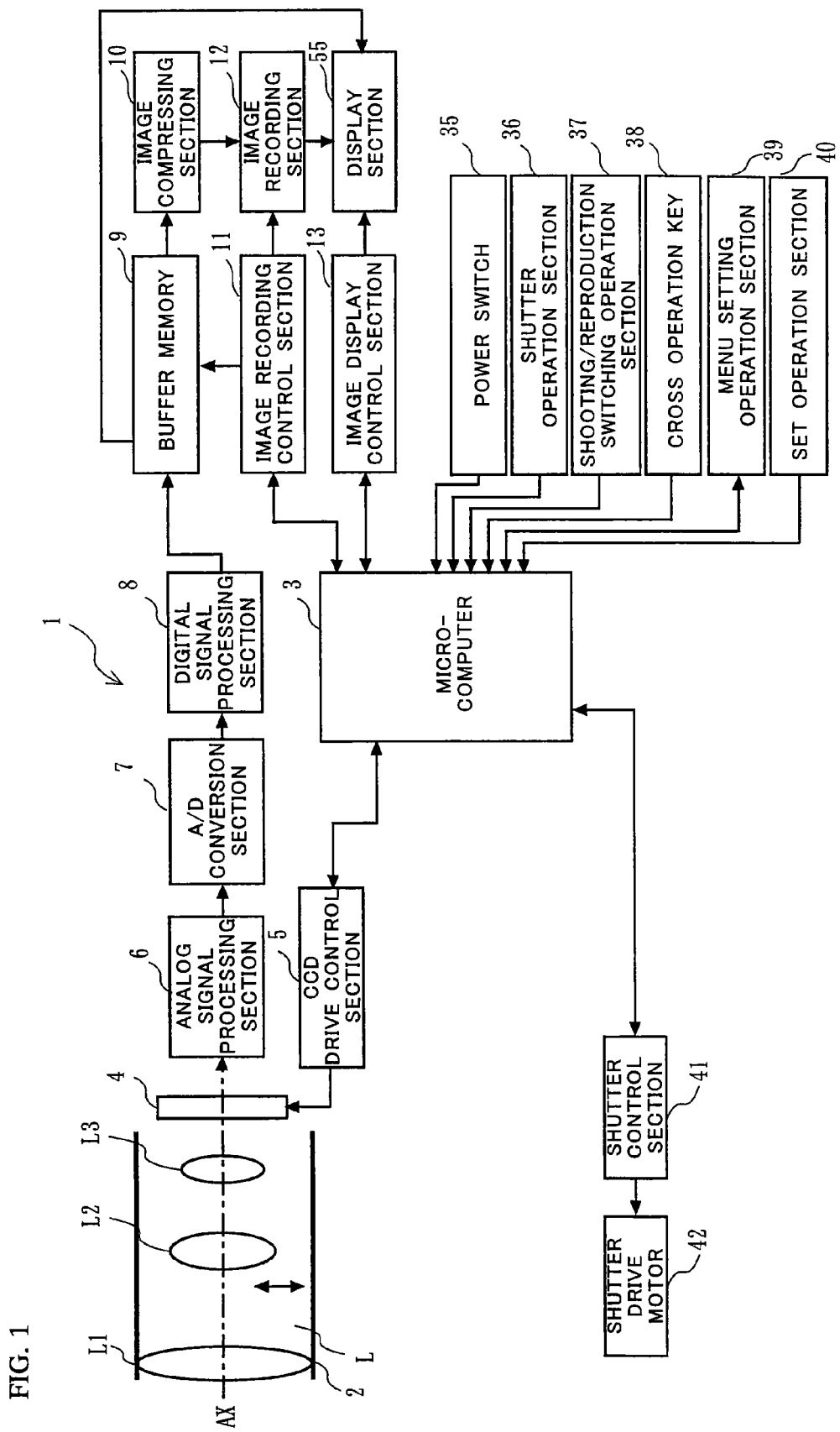
FIG. 1 is a block diagram showing a configuration of a digital camera, which is an imaging device according to embodiment 1 of the present invention.

DESCRIPTION OF THE REFERENCE CHARACTERS 1 digital camera
1a housing
2 lens
3 microcomputer
3A signal processing section
4 imaging sensor
5 CCD drive control section
6 analog signal processing section
7 A/D conversion section
8 digital signal processing section
9 buffer memory
10 image compressing section
11 image recording control section
12 image recording section
13 image display control section
14A shooting attitude detection section
14x yawing current value detection section
14y pitching current value detection section
15A motion compensation section
15x yawing drive control section
15y pitching drive control section
16 position detection section
17A motion detection section
17x yawing angular velocity sensor
17y pitching angular velocity sensor
18x, 18y A/D conversion section
19x, 19y D/A conversion section
20 image blurring compensation mechanism
21 pitching holding frame
22 yawing holding frame
23a, 23b pitching shaft
24x, 24y coil
25 fixing frame
26a, 26b yawing shaft
27 magnet
28 yoke
29x yawing actuator
29y pitching actuator
30 light-emitting element
31 photo-detecting element
30 power switch
36 shutter operation section
37 shooting/reproduction switching operation section
38 cross operation key
39 MENU setting operation section
40 SET operation section
41 shutter control section
42 shutter drive motor
50 internal memory
51 removable memory
55 display section
57 zoom operation section
60 panning mode signal
61 attitude determination signal
65 image selection menu
65a consecutively shot image 1 selection button
65b consecutively shot image 2 selection button
65c horizontal image selection button
65d vertical image selection button
70 display device
71 printing device
75 cable
76 cable
81 removable memory insertion means
82 display control device
83 print control device
84 display/print control device
90 shot image folder
91 consecutively shot image folder
92 normal image folder
93a horizontal image folder 93b vertical image folder
94a consecutively shot image folder #1
94b consecutively shot image folder #2
94c consecutively shot image folder #3
95a, 95b consecutively shot image file
96 image file
L imaging optical system
L1 first lens unit
L2 second lens unit
L3 third lens unit

BEST MODE FOR CARRYING OUT THE INVENTION

Embodiment 1

With reference to FIG. 1, an imaging device according to embodiment 1 of the present invention will be described. In the present embodiment, the imaging device is configured as a digital camera 1. The digital camera 1 includes an imaging optical system L, a microcomputer 3, an imaging sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, a power switch 35, a shutter operation section 36, a shooting/reproduction switching operation section 37, a cross operation key 38, a MENU setting operation section 39, a SET operation section 40, a shutter control section 41, a shutter drive motor 42, and a display section 55.

The imaging optical system L is an optical system including three lens units L1, L2, and L3. A first lens unit L1 moves in an optical axis direction, whereby focusing is performed, and a third lens unit L3 moves in the optical axis direction, whereby zooming is performed. A second lens unit L2 is a compensation lens unit, and plays a role of compensating a motion of an image by moving on a plane perpendicular to the optical axis so as to decenter the optical axis.

When a mechanical vibration or a jiggle caused by a photographer is applied to the digital camera 1, light emitted from an object to a lens is misaligned with respect to an optical axis of an imaging unit consisting of a lens and the imaging sensor 4. Therefore, an image obtained with the imaging sensor 4 will be a blurred image. A preventive mechanism provided against this is called "image blurring compensation mechanism". Further, in the present embodiment, the image blurring compensation mechanism can be also used as attitude detection means and panning mode detection means of the digital camera 1. A structure and an operation thereof will be described later.

The microcomputer 3 receives various signals outputted from the power switch 35, the shutter operation section 36, the shooting/reproduction switching operation section 37, the cross operation key 38, the MENU setting operation section 39, and the SET operation section 40. The microcomputer 3 controls the whole of various control sections of the digital camera 1 by generating various control signals based on the received signals.

In response to a timing signal generated by an operation of the shutter operation section 36, the shutter control section 41 drives the shutter drive motor 42 in accordance with a control signal outputted by the microcomputer 3, and then actuates a shutter.

The imaging sensor 4 is drive-controlled by the CCD drive control sections, and converts an optical image formed by an imaging optical system L into an electrical signal. The imaging sensor 4 is preferably configured with a CCD, and may be configured with a CMOS.

An image signal outputted by the imaging sensor 4 is processed through the analog signal processing section 6, the A/D conversion section 7, the digital signal processing section 8, the buffer memory 9, and the image compressing section 10, in sequence. In the analog signal processing section 6, the image signal outputted by the imaging sensor 4 is subject to analog signal processing such as gamma processing. The A/D conversion section 7 converts an analog signal outputted by the analog signal processing section 6 into a digital signal. In the digital signal processing section 8, the image signal, which is a digital signal, converted by the A/D conversion section 7 is subject to digital signal processing such as noise reduction and edge enhancement. The buffer memory 9 is a PAM (Random Access Memory), and temporarily records the image signal processed by the digital signal processing section 8.

Further, the image signal recorded in the buffer memory 9 is processed through the image compressing section 10 and the image recording section 12 in sequence. Specifically, the image signal stored in the buffer memory 9 is transmitted to the image compressing section 10 in accordance with a command issued by the image recording control section 11. Data of the image signal is compressed to a predetermined size by the image compressing section 10. In this case, the image signal is compressed, at a predetermined rate, into a smaller data size than the original data. As an exemplary compression method, a JPEG (Joint Photographic Experts Group) method or the like may be used. The image compressing section 10 concurrently generates a reduced image signal which is used for a thumbnail display or the like and corresponds to a shot image. Then, the compressed image signal and the reduced image signal are transmitted to the image recording section 12.

The image recording section 12 includes an internal memory 50 (not shown), which is provided to a body of the digital camera 1, and/or a removable memory 51. In accordance with a command outputted by the image recording control section 11, the image recording section 12 interrelates and records the image signal, the reduced image signal corresponding thereto, and predetermined information to be recorded. The predetermined information to be recorded together with the image signal includes a date when an image was shot, focal length information, shutter speed information, aperture value information, shooting mode information, attitude of the digital camera 1, and panning mode information, which are described later.

The image display control section 13 is controlled by the control signal outputted by the microcomputer 3. In accordance with a command outputted by the image display control section 13, the display section 55 displays the image signal recorded in the image recording section 12 or in the buffer memory 9 as a visible image. As display modes, the display section 55 has a mode for displaying only an image signal and a mode for displaying information at the time of shooting of the image signal. The information at the time of shooting of the image signal includes the focal length information, the shutter speed information, the aperture value information, the shooting mode information, focusing state information, and the attitude information. These pieces of information are displayed by operating the MENU setting operation section 39.

Figure 2:
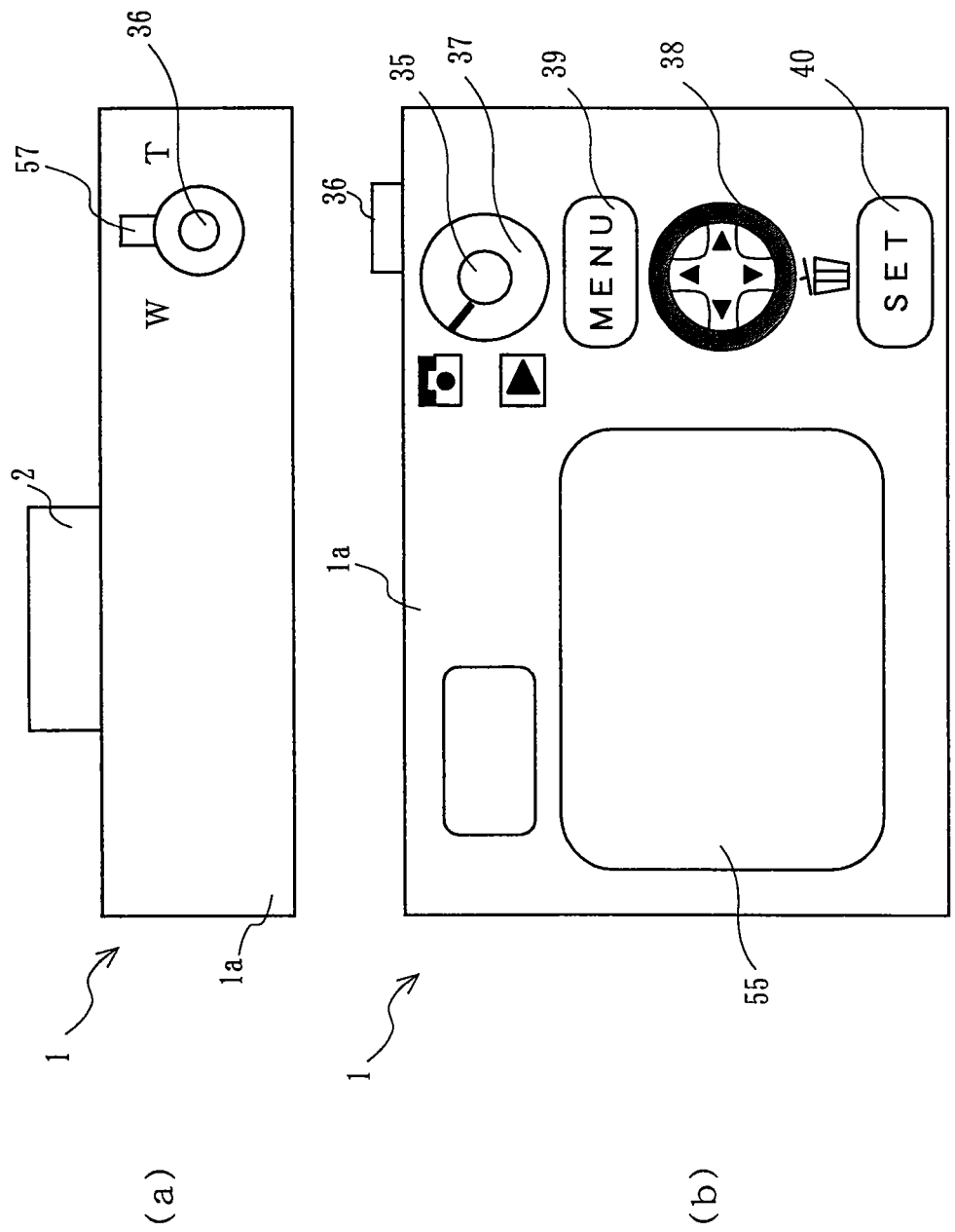
FIG. 2 is an outline drawing of the digital camera shown in FIG. 1.

With reference to FIG. 2, a shape and a configuration of the digital camera 1 will be described specifically. FIG. 2(a) shows a top surface of the digital camera 1, and FIG. 2(b)

shows a back surface of the digital camera 1. As shown in FIG. 2(a), on a front surface of a housing 1a of the digital camera 1, an imaging optical system including a lens 2 is provided. Further, on a top surface of the housing 1a, the shutter operation section 36 and a zoom operation section 57 are provided.

As shown in FIG. 2(b), on a back surface of the housing 1a, the power switch 35, the shooting/reproduction switching operation section 37, the cross operation key 38, the MENU setting operation section 39, the SET operation section 40, and the display section 55 including a LCD monitor are provided.

The zoom operation section 57 is rotatably located in the vicinity of the shutter operation section 36 so as to be coaxial with the shutter operation section 36. The power switch 35 is an operation member for turning the power of the digital camera 1 ON/OFF. The shooting/reproduction switching operation section 37 is an operation member for switching between a shooting mode and a reproduction mode, and every time a user rotates a lever thereof, mode switching is performed. Under the condition that the shooting mode is selected, imaging optical system L is controlled by the microcomputer 3 so as to become telephoto when the zoom operation section 57 is rotated to the right direction and so as to be wide-angle when the zoom operation section 57 is rotated to the left direction.

The MENU setting operation section 39 is an operation member for causing the display section 55 to display various menus. The cross operation key 38 is an operation member for selecting, based on the user's pressing of any one portion of up, down, right and left portions thereof, a desired menu from among the various operation menus, which are displayed on the display section 55 in accordance with the user's operation of the MENU setting operation section 39. When any one of the various operation menus is selected based on the user's operation of the cross operation key 38, the microcomputer 3 issues a command for execution. The SET operation section 40 is an operation member which is operated by the user in order to return the display of the various operation menus to a state prior to such display.

Figure 3:
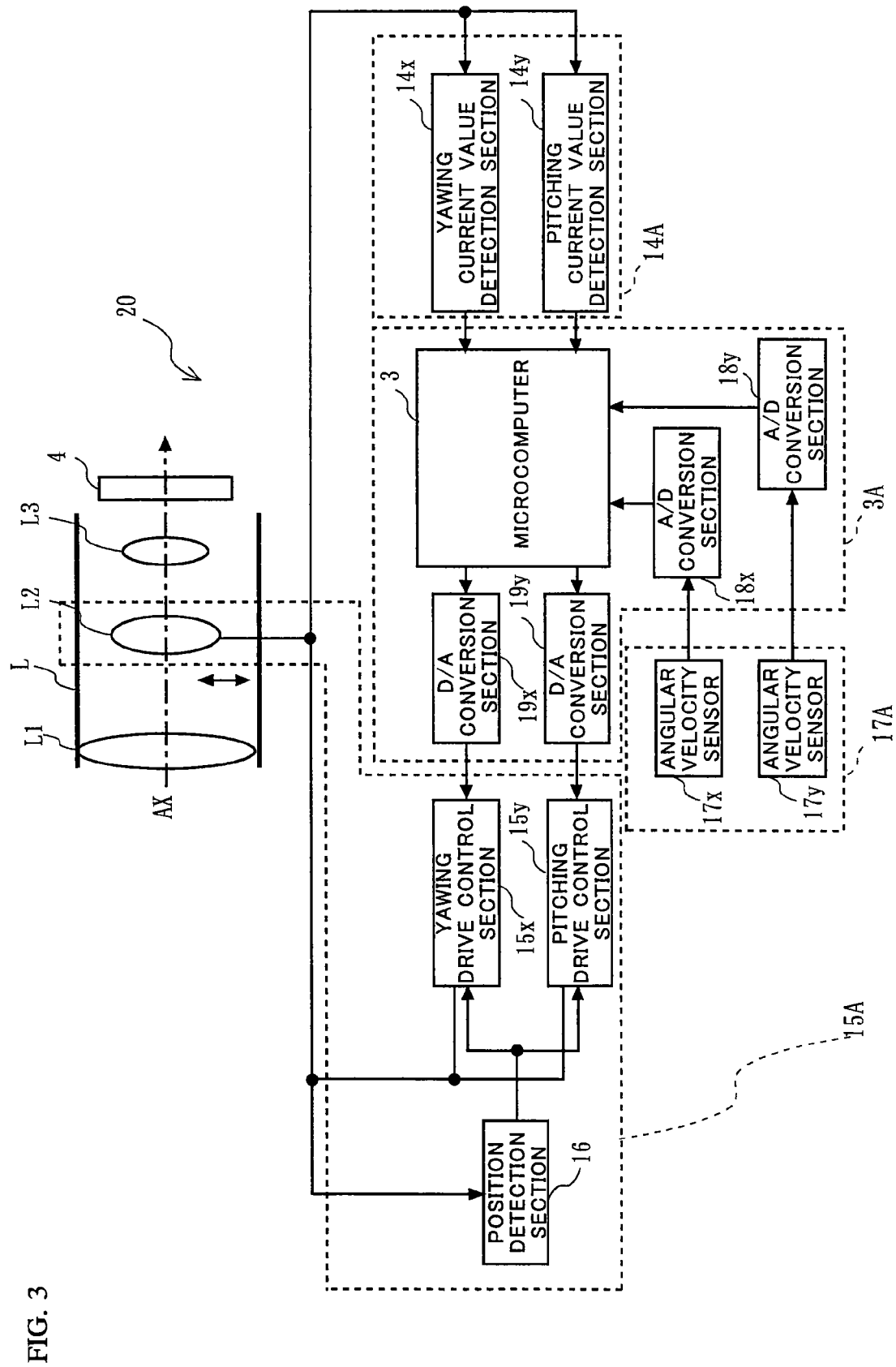
FIG. 3 is a block diagram showing a configuration of an image blurring compensation mechanism of the digital camera shown in FIG. 1.

With reference to FIG. 3, a control system of an image blurring compensation mechanism 20 of the above-described digital camera 1 will be described. In FIG. 3, the control system of the image blurring compensation mechanism 20 includes a motion compensation section 15A, a shooting attitude detection section 14A, a motion detection section 17A, and a signal processing section 3A. The motion compensation section 15A controls an optical axis of imaging light.

The motion compensation section 15A includes the second lens unit L2, a yawing drive control section 15x, a pitching drive control section 15y, and a position detection section 16. The second lens unit L2 is a compensation lens unit which plays a role of compensating a motion of an image by moving on a plane perpendicular to the optical axis and decentering the optical axis. The second lens unit L2 is drive-controlled in two directions, i.e., an X direction and a Y direction, which are perpendicular to the optical axis AX, by the yawing drive control section 15x and the pitching drive control section 15y. Hereinafter, the X direction is referred to as a "yawing direction", and the Y direction is referred to as a "pitching direction". The position detection section 16 is detection means for detecting a position of the second lens unit L2, and forms a feedback control loop for controlling the second lens unit L2 in combination with the yawing drive control section 15x and the pitching drive control section 15y.

The shooting attitude detection section 14A includes a yawing current value detection section 14x and a pitching current value detection section 14y. The yawing current value detection section 14x detects a value of a current which is applied to a coil when a yawing actuator 29x to be described later is actuated. In a similar manner, the pitching current value detection section 14y detects a value of a current which is applied to a coil when a pitching actuator 29y is actuated.

The motion detection section 17A includes a yawing angular velocity sensor 17x and a pitching angular velocity sensor 17y. The yawing angular velocity sensor 17x and the pitching angular velocity sensor 17y are sensors for detecting a motion of the imaging device including the imaging optical system L due to a hand blur or other vibration, and detect motions in two directions, i.e., in the yawing direction and in the pitching direction, respectively. Note that the yawing angular velocity sensor 17x and the pitching angular velocity sensor 17y are generically referred to as angular velocity sensors 17x and 17y. The angular velocity sensors 17x and 17y use, as a reference, their own outputs outputted when the digital camera 1 is in a static state and output positive or negative angular velocity signals depending on the direction in which the digital camera 1 moves. The outputted signals are processed by the signal processing section 3A.

The signal processing section 3A includes the microcomputer 3, A/D conversion sections 18x and 18y, and D/A conversion sections 19x and 19y. The angular velocity signals outputted by the angular velocity sensors 17x and 17y are subject to filtering processing, amplification processing and the like, converted into digital signals by the A/D conversion sections 18x and 18y, respectively, and then provided to the microcomputer 3. The microcomputer 3 causes the angular signals, which are outputted by the angular velocity sensors 17x and 17y and then obtained via the A/D conversion sections 18x and 18y, to be subject to various types of processes such as filtering, an integrating process, phase compensation, gain adjustment, clipping and the like.

Based on the above-described various types of processes, the microcomputer 3 calculates a drive-control amount of the second lens unit L2, which is necessary for motion compensation, thereby generating control signals. The generated control signals are, respectively, outputted to the yawing drive control section 15x and the pitching drive control section 15y via the D/A conversion sections 19x and 19y. The yawing drive control section 15x and the pitching drive control section 15y drive the second lens unit L2 in accordance with the control signals, thereby compensating a motion of an image.

Figure 4:
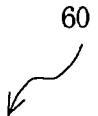
FIG. 4 is a diagram illustrating panning mode signals of respective panning modes of the digital camera shown in FIG. 1.

Based on the fact that a situation in which the angular velocity has a constant sign and is equal to or greater than a predetermined level is continuously kept while panning is performed, the signal processing section 3A generates a panning mode signal 60 illustrated in FIG. 4 depending on whether or not the angular velocity signals outputted by the angular velocity sensors 17x and 17y are continuously equal to or greater than a predetermined for a predetermined time period.

Figure 5:
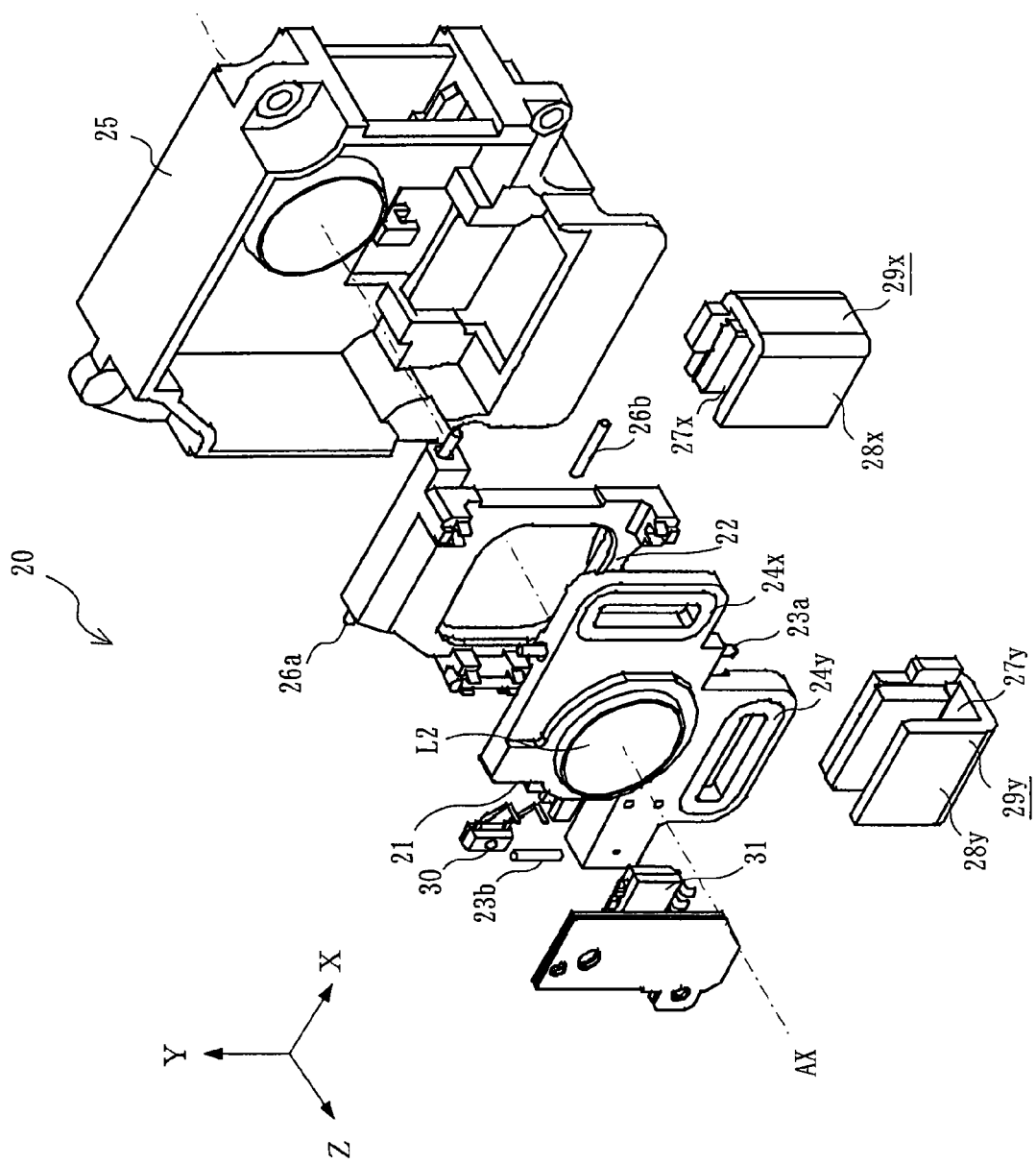
FIG. 5 is an exploded perspective view showing a configuration of the image compensation mechanism of the digital camera shown in FIG. 1.

Next, with reference to FIG. 5, a specific configuration of the image blurring compensation mechanism 20 will be described. As shown in the drawing, the image blurring compensation mechanism 20 includes a pitching holding frame 21, a yawing holding frame 22, a fixing frame 25, the yawing actuator 29x, the pitching actuator 29y, a light-emitting element 30, and a photo-detecting element 31.

The pitching holding frame 21 has coils 24x and 24y. The second lens unit L2 and the light-emitting element 30 are fixed to the pitching holding frame 21. The pitching holding frame 21 is coupled to the yawing holding frame 22 via two pitching shafts 23a and 23b so as to be slidable in the Y direction. The yawing holding frame 22 is coupled to the fixing frame 25 via yawing shafts 26a and 26b so as to be slidable in the X direction.

The yawing actuator 29x has a magnet 27x, and a yoke 28x, and is coupled to the fixing frame 25. In a similar manner, the pitching actuator 29y has a magnet 27y and a yoke 28y, and is coupled to the fixing frame 25. The photo-detecting element 31 is fixed to the fixing frame 25, receives light emitted from the light-emitting element 30, and detects two-dimensional position coordinates.

Figure 6:
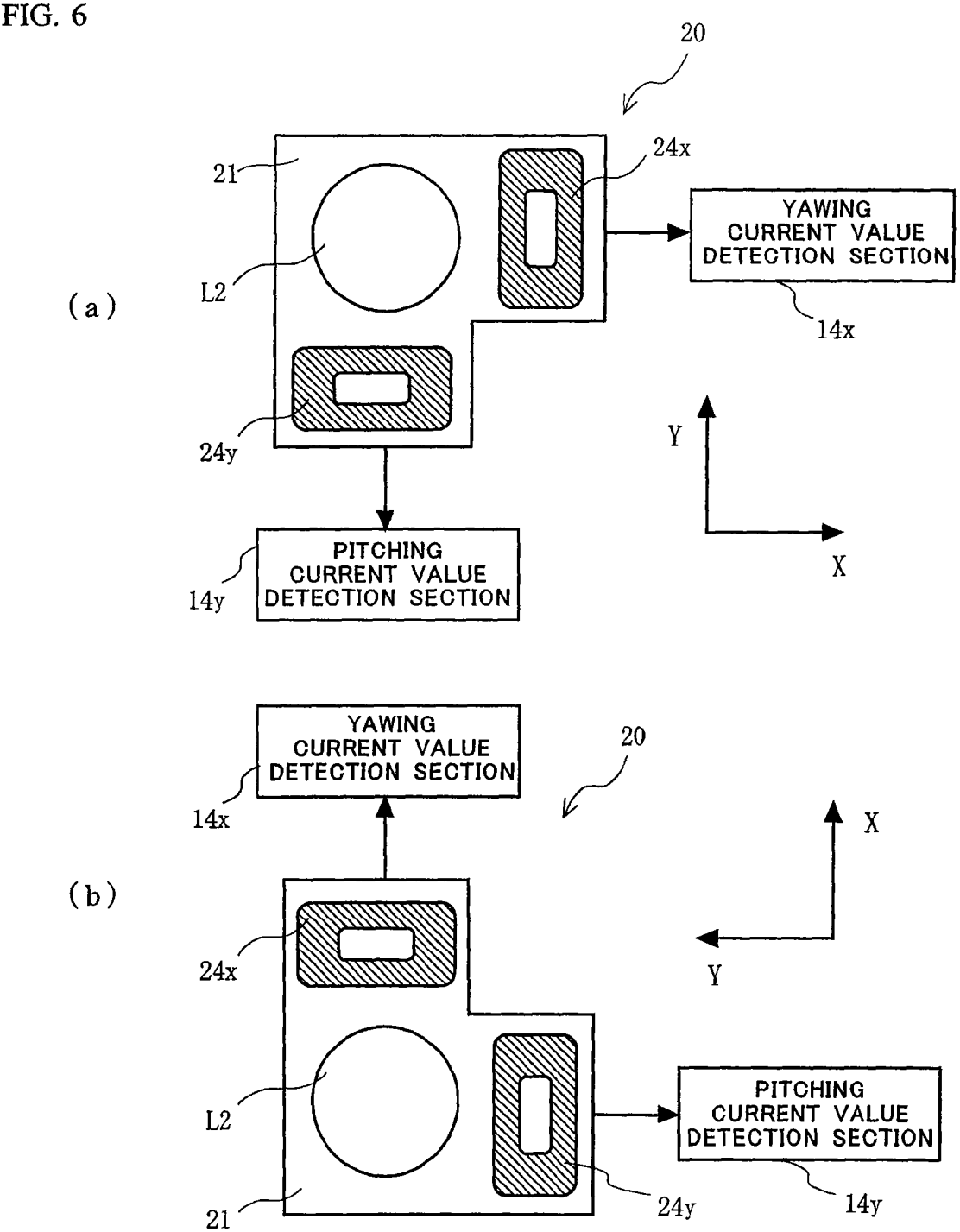
FIG. 6 is a diagram illustrating an attitude of the image blurring compensation mechanism shown in FIG. 5.
Figure 7:
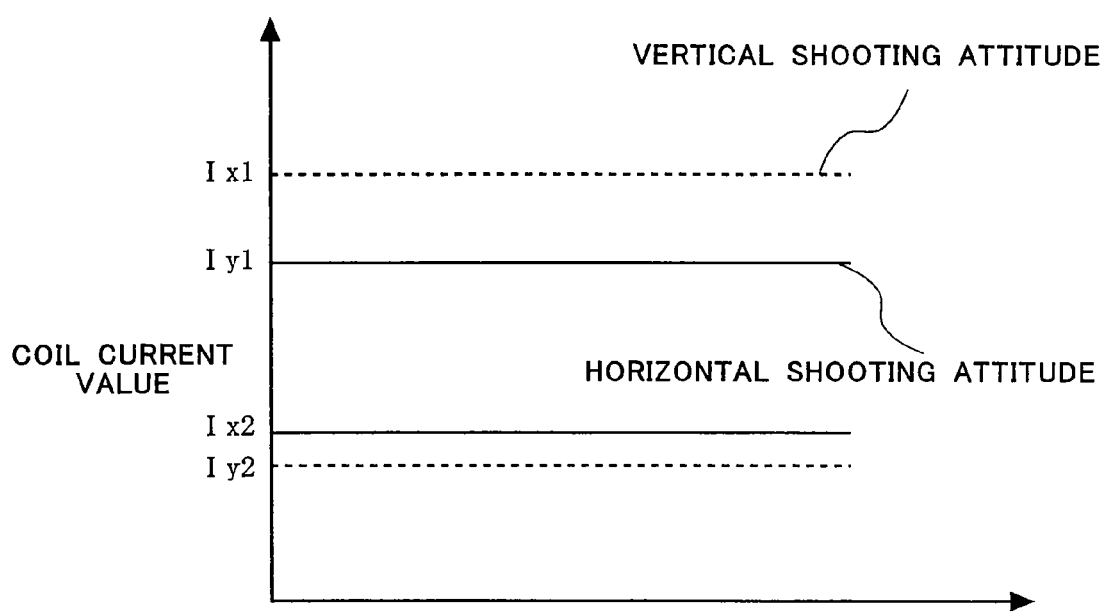
FIG. 7 is a diagram showing an example of current amounts supplied to coils in each attitude shown in FIG. 6.

Next, with reference to FIGS. 6 and 7, a current value detection method, in which the yawing current value detection section 14x and pitching current value detection section 14y are used, will be described. FIG. 6 shows an example of attitudes of the image blurring compensation mechanism 20. Specifically, FIG. 6(a) shows an attitude of the image blurring compensation mechanism 20 at the time of shooting in a horizontal shooting attitude, and FIG. 6(b) shows an attitude of the image blurring compensation mechanism 20 at the time of the shooting in a vertical shooting attitude. FIG. 7 shows the amounts of the currents supplied to the coils in each of the shooting attitudes.

In the case of the horizontal shooting attitude as shown in FIG. 6(a), a weight of each of the second lens unit L2, the pitching holding frame 21, the coils 24x and 24y, and the yawing holding frame 22 is applied in the Y direction, which is the gravity direction. In this case, the second lens unit L2 needs to be supported toward the optical axis so as to obtain an appropriate image. Accordingly, an electromagnetic force needs to be generated so as to support a self-weight of the second lens unit L2. In order to generate a necessary electromagnetic force, a current Iy1 is supplied to the coil 24y. On the other hand, in the X direction, since it is not necessary to consider a force to support the self-weight of the second lens unit L2, a value of a current Ix2 supplied to the coil 24x is smaller than the value of the current Iy1 supplied to the coil 24y.

In the case of the vertical shooting attitude, which is rotated about the optical axis by 90 degrees from the horizontal shooting attitude as shown in FIG. 6(b), the weight of the each of the second lens unit L2, the pitching holding frame 21, the coils 24x and 24y, and the yawing holding frame 22 is applied in the X direction, which is the gravity direction. In this case, the second lens unit L2 needs to be supported toward the optical axis. Therefore, the electromagnetic force to support a self-weight of the yawing holding frame 22 in addition to the self-weight of the second lens unit L2 needs to be generated in the X direction.

Accordingly, in order to generate a necessary electromagnetic force, a current Ix1 is supplied to the coil 24x. In consideration of the self-weight of the yawing holding frame 22, a value of the current Ix1 is larger than a value of the current Iy1 supplied to the coil 24y in the case of the horizontal shooting attitude. On the other hand, in the Y direction, it is not necessary to consider a force to support the self-weight of the second lens unit L2 toward the optical axis, and thus a value of a current Iy2 supplied to the coil 24y is smaller than the value of the current Ix1 supplied to the coil 24x.

As above described, the value of each of the currents Ix1 and Iy1 supplied to each of the coils 24x and 24y is determined depending on the shooting attitude of the digital camera 1. In other words, the shooting attitude of each of the image blurring compensation mechanism 20 and the digital camera 1 is determined by detecting the value of the current passing through each of the coils. Therefore, it is possible to use the image blurring compensation mechanism 20 not only as a function for preventing image blurring but also as means for detecting the attitude of the digital camera 1.

Figure 8:
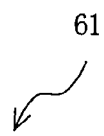
FIG. 8 is a diagram showing values of an attitude determination signal corresponding to respective shooting attitudes of the digital camera shown in FIG. 1.

Next, with reference to FIGS. 7 and 8, an operation of the digital camera 1 according to the present embodiment will be described. FIG. 8 shows values of attitude determination signal 61 corresponding to respective shooting attitudes. When shooting, the photographer turns the power switch 35ON, and turns the shooting/reproduction switching operation section 37 to the shooting mode. At the result, the digital camera 1 is shifted to a shooting state. After the shift to the shooting state, hand blur or vibration applied to the digital camera 1 is detected by the angular velocity sensors 17x and 17y.

The microcomputer 3 provides a command signal to the yawing drive control section 15x and the pitching drive control section 15y so as to cancel the generated vibration such as hand blur. A current responding to the command signal is supplied to each of the coils 24x and 24y of the pitching holding frame 21. Due to a magnetic circuit which is formed by the supplied current and the actuators 29x and 29y, the pitching holding frame 21 moves on a plane defined by the X direction and the Y direction (hereinafter abbreviated as "XY-plane") which are respectively perpendicular to the optical axis AX.

Further, a position of the pitching holding frame 21 is detected highly accurately by using the photo-detecting element 31. In other words, image blurring compensation mechanism 20 causes the second lens unit L2 to move on the XY-plane perpendicular to the optical axis AX. Accordingly, the photographer can compensate an image which enters into the imaging sensor 4 through the imaging optical system L, and thus shoot a high quality image while suppressing image blurring.

The shooting attitude of the digital camera 1 is determined as follows. The horizontal shooting attitude is set as a reference of the attitude of the digital camera 1, and the angle in this case is set as 0 degree. Accordingly, the digital camera 1 in the vertical shooting attitude corresponds to a state where the attitude thereof is rotated about the optical axis AX by 90 degrees from the state of the horizontal attitude.

A case where the photographer shoots a horizontally long object, such as a landscape, in the horizontal shooting attitude will be described. The attitude of the digital camera 1 is determined based on the values of the currents detected by the yawing current value detection section 14x and the pitching current value detection section 14y. In FIG. 7, in the case of shooting in the horizontal shooting attitude, i.e., in a 0-degree attitude, the values the current Ix2 and the current Iy1 respectively passing through the coil 24x and the coil 24y of the image blurring compensation mechanism 20 are detected by the yawing current value detection section 14x and the pitching current value detection section 14y, respectively. Based on the values of the currents, the microcomputer 3 determines that the attitude of the digital camera 1 is the horizontal shooting attitude.

In this situation, when the photographer presses the shutter operation section 36, the object is shot. An image of the shot object is recorded in the image recording section 12. As shown in FIG. 8, the image recording control section 11 adds an attitude determination signal 61 (0), which indicates that the shooting attitude of the digital camera 1 is 0 degree, to an image signal outputted from the buffer memory 9. The attitude determination signal 61 is recorded in a header or a footer part of the image signal, for example. With regard to timing, the attitude determination signal 61 may be recorded either in the buffer memory 9 or in the image recording section 12.

On the other hand, in the case where the photographer shoots a vertically long object such as human beings in the vertical shooting attitude, the attitude of the digital camera 1 is determined, based on the values of the currents detected by the yawing current value detection section 14x and the pitching current value detection section 14y, in the same manner as the case of the horizontal shooting attitude. As shown in FIG. 7, in the case of shooting in the vertical shooting attitude, i.e., in a 90-degree attitude, the current Ix1 and the current Iy2 respectively passing through the coil 24x and the coil 24y of the image blurring compensation mechanism 20 are detected by the yawing current value detection section 14x and the pitching current value detection section 14y, respectively.

Based on the values the currents, the microcomputer 3 can determine that the attitude of the digital camera 1 is the vertical shooting attitude. In this situation, when the photographer presses the shutter operation section 36, the object is shot. An image of the shot object is recorded in the image recording section 12. In this case, the image recording control section 11 adds an attitude determination signal 61(1) to an image signal outputted from the buffer memory 9, the attitude determination signal 61(1) indicating that the shooting attitude of the digital camera 1 is the vertical shooting attitude which is obtained by being rotated about the optical axis AX by 90 degrees from the horizontal shooting attitude.

Next, a case where a moving object is followed and consecutively shot will be described. The photographer operates the MENU setting operation section 39 and causes a screen of various menus to be displayed on the display section 55. Then, from among the various menus in the screen having been displayed, a consecutive shooting mode is selected. At the result, the digital camera 1 is shifted to an image recording mode, and the microcomputer 3 then determines the mode as the consecutive shooting mode. In the case where consecutive shooting is performed by panning in the horizontal direction toward the right, the microcomputer 3 determines, based on an example shown in above-described FIG. 4, a signal from the angular velocity sensor 17 as the panning mode signal 60(1). In a similar manner, in the case of panning toward the left, the panning mode signal 60(2) is determined. In the case of panning toward an upper direction, the panning mode signal 60(3) is determined. In the case of panning toward a lower direction, the panning mode signal 60(6) is determined. And, in the case panning toward one of diagonal directions, corresponding one of the panning mode signals 60(4), 60(5), 60(7), and 60(8) is determined. The image recording control section 11 adds the panning mode signal 60 together with the attitude determination signal 61 to the image signal outputted from the buffer memory 9.

Figure 9:
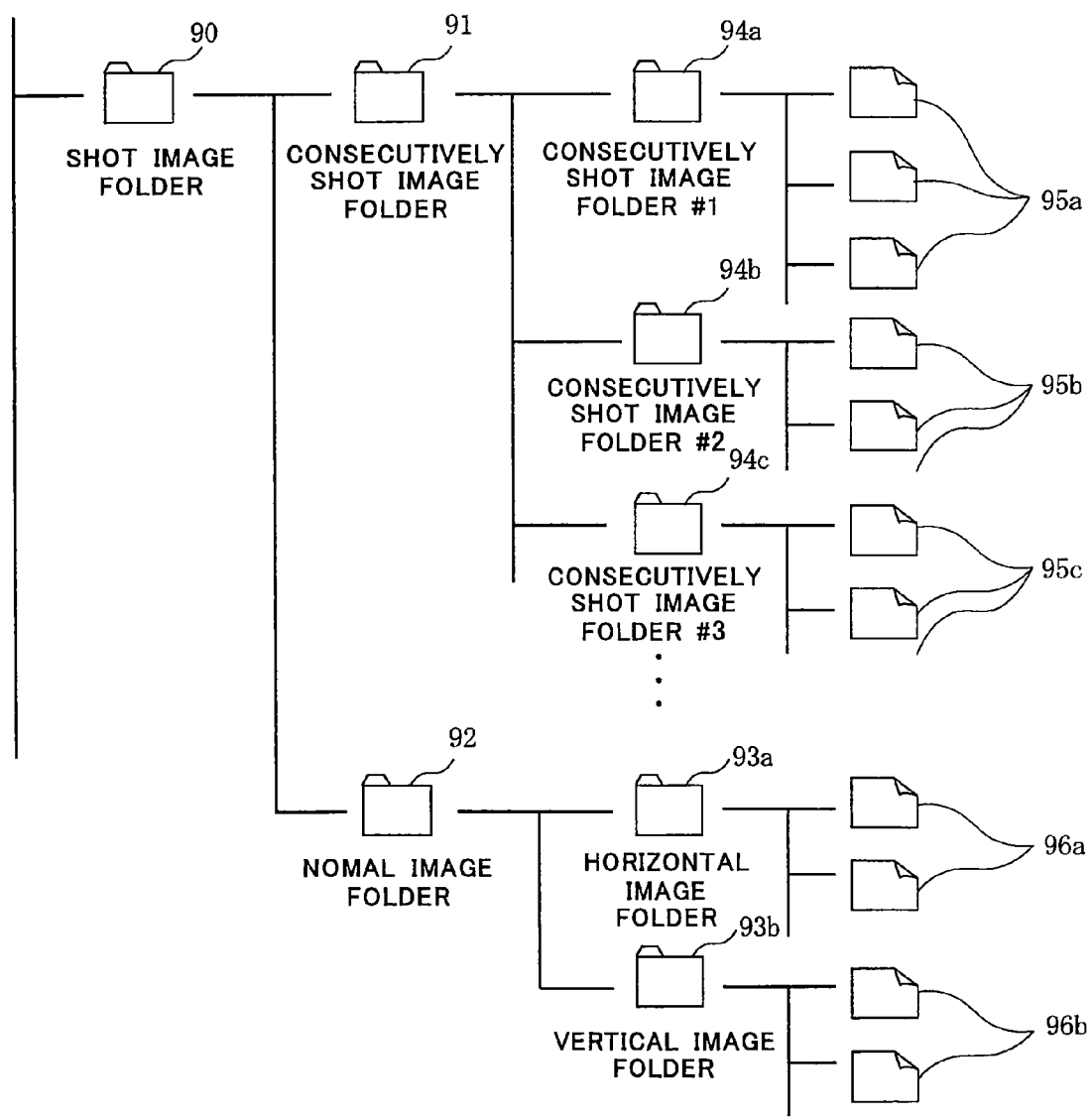
FIG. 9 is a diagram illustrating a managing method of shot image files in the digital camera shown in FIG. 1.

Next, with reference to FIGS. 9 and 10, a managing method of a shot image file will be described. As shown in FIG. 9, a shot image folder 90 is created in the internal memory 50 or in the removable memory 51. In a hierarchy under the shot image folder 90, a consecutively shot image folder 91 and a normal image folder 92 are created. Further, in a hierarchy under the consecutively shot image folder 91, consecutively shot image folders #1, #2, #3 are created, whereas in a hierarchy under the normal image folder 92, a horizontal image folder 93a and a vertical image folder 93b are created. The consecutively shot image folder #1, #2, #3 . . . are identified by reference characters 94a, 94b, 94c . . . , which are each composed of a numerical code, 94, and an alphabetical suffix added thereto.

A series of images shot in the consecutive shooting mode is stored in the consecutively shot image folders #1 (94a), #2 (94b), #3 (94c) . . . as image files 95a, 95b, 95c . . . together with the attitude information and the panning mode signal 60.

On the other hand, in the normal shooting mode, the shot images are stored, as an image file 96, either in the horizontal image folder 93a or in the vertical image folder 93b. In the horizontal image folder 93a, a horizontal image file 96a is stored, and in the vertical image folder 93b, a vertical image file 96b is stored.

Figure 10:
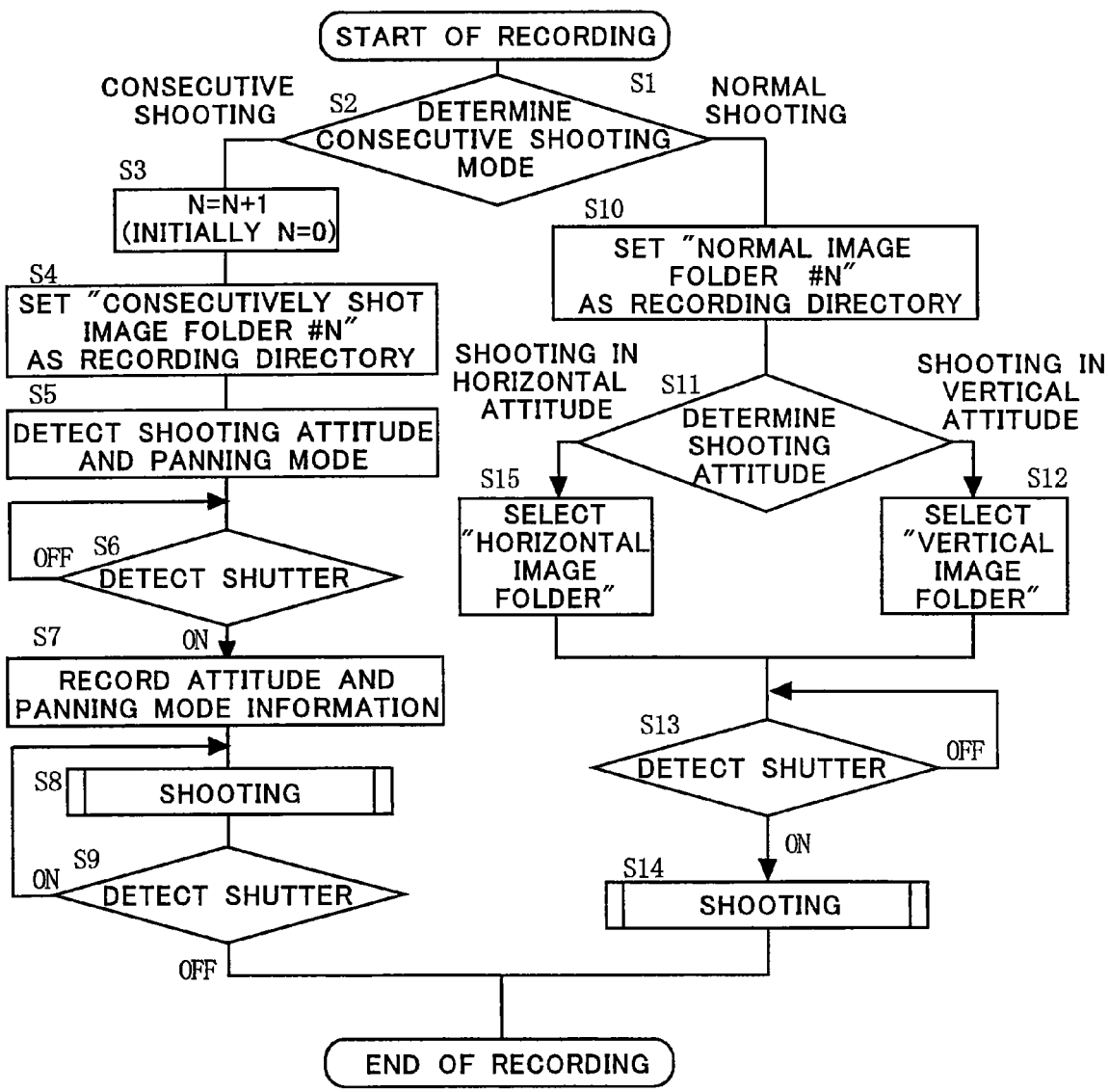
FIG. 10 is a flowchart showing a recoding method of shot images in the digital camera shown in FIG. 1.

FIG. 10 shows a flow of operations from the start of recording to the end of recording of a shot image. First, the photographer presses the MENU setting operation section 39 so as to record a shot image, and causes the screen of the various menus to the displayed on the display section 55. "Image recording" is selected from the displayed screen of the various menus. Accordingly, the digital camera 1 is shifted to an image recording mode (step S1).

Next, the microcomputer 3 determines the shooting mode. The microcomputer 3 determines which mode, either the consecutive shooting mode or the normal shooting mode, the photographer has selected (step S2).

In the case where the photographer has selected the consecutive shooting mode, the microcomputer 3 adds 1 to a variable N, whose initial value is 0 (step S3). A consecutively shot image folder #N is set as a recording directory in which the shot image is to be recorded (step S4).

The attitude and the panning mode of the digital camera 1 are then detected (step S5). Next, pressing of the shutter operation section 36 is waited for (step S6), and in the case where the same is pressed, the attitude information and the panning mode information are recorded (step S7), and then shooting is performed (step S8). Thereafter, whether or not the shutter is continuously pressed is detected (step S9).

In the case where the shutter is continuously pressed, shooting is performed consecutively, whereas in the case where the same is not being pressed, recording of the shot images ends. In this case, the shot images are stored in the consecutively shot image folder #1, #2, as the image file 95a, 95b On the other hand, in the case where it is determined that the photographer has selected a normal shooting mode (step S2), the microcomputer 3 sets a normal image folder 92 as a recording directory in which the shot image is to be recorded (step S10). The attitude of the digital camera 1 is then determined by the shooting attitude detection section 14A (step S11). Further, in the case of shooting in the horizontal shooting attitude, the horizontal image folder 93a is set as a folder in which the shot image is to be stored (step S15).

On the other hand, in the case of shooting in the vertical shooting attitude, the vertical image folder 93b is set as the folder in which the shot image is to be stored (step S12). Next, the pressing of the shutter operation section 36 is waited for (step S13), and in the case where the same is pressed, shooting is performed (step S14). Thereafter, recording ends. In this case, the shot images are stored in the horizontal image folder 93a and the vertical image folder 93b, as a horizontal image file 96a and a vertical image file 96b, respectively.

Figure 11:
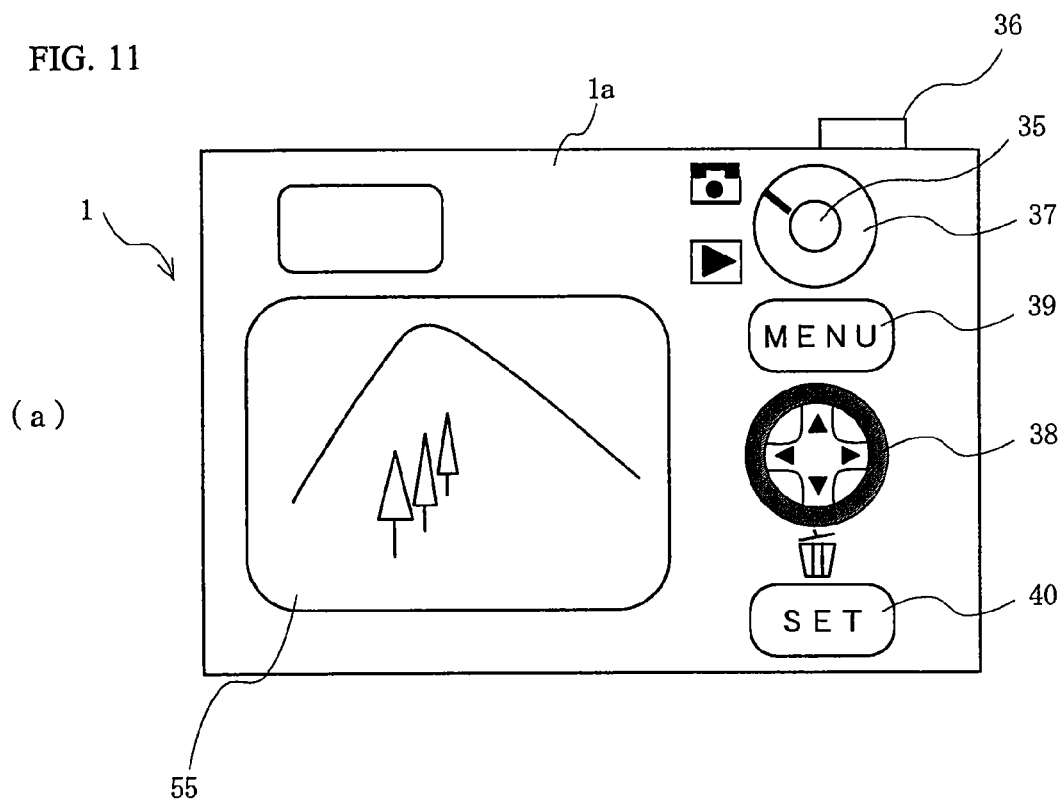
FIG. 11 is a diagram illustrating a display method for displaying the shot images on a display section of the digital camera shown in FIG. 1.
Figure 11:
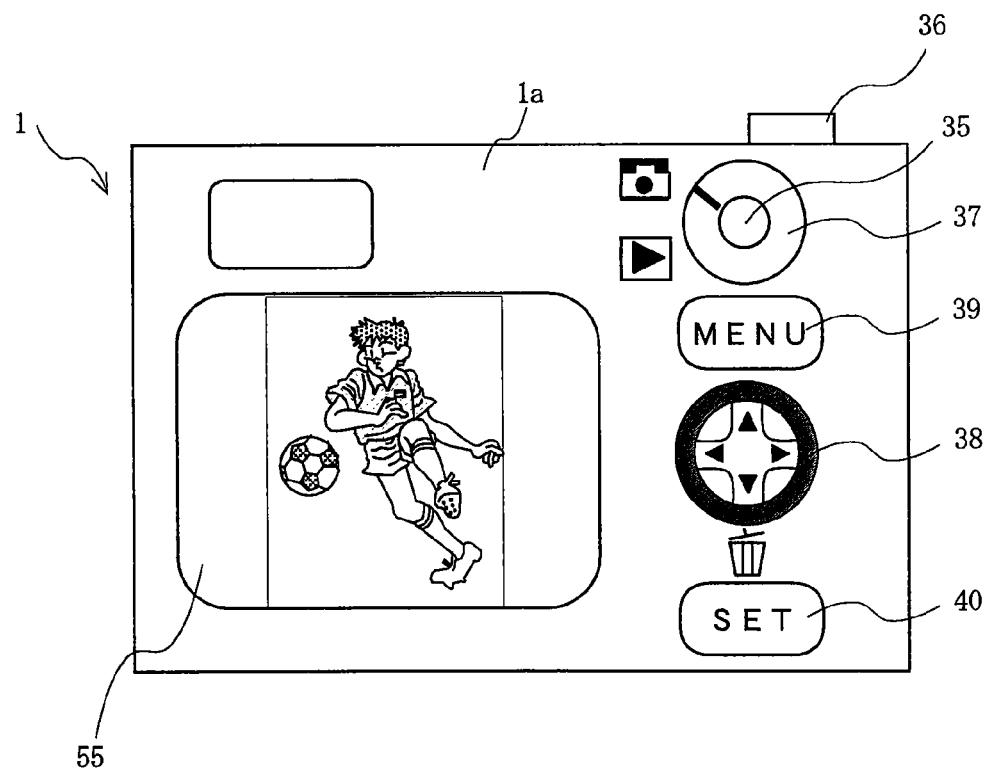

Next, with reference to FIG. 11, a display method for causing the display section 55 to display an image obtained by shooting with the digital camera 1 will be described. First, in order to cause the display section 55 to display the shot image, the power switch 35 is turned ON, and then the shooting/reproduction switching operation section 37 is turned to the reproduction mode. When an image is selected by using the cross operation key 38 from images which are displayed in thumbnailed form, one of shot images can be displayed on the display section 55. At that time, with respect to the display method of the shot image, the image display control section 13 controls an image to be displayed in accordance with the attitude determination signal 61 which is recorded at the time of shooting.

To the image shot in the horizontal shooting attitude, 0 is added as the attitude determination signal 61 at the time of shooting. As shown in FIG. 11(*a*), the image display control section 13 controls the shot image such that the shot image is to be displayed on the display section 55 after the angle of the shot image has been restored to the same attitude as that at the time of the shooting.

On the other hand, to the image shot in the vertical shooting attitude, 1 is added as the attitude determination signal 61. Therefore, as shown in FIG. 11(*b*), the image display control section 13 controls the shot image such that the shot image is to be displayed on the display section 55 after the angle of the shot image has been rotated by 90 degrees, that is, after the angle of the shot image has been restored to the same angle as that at the time of the shooting.

Figure 12:
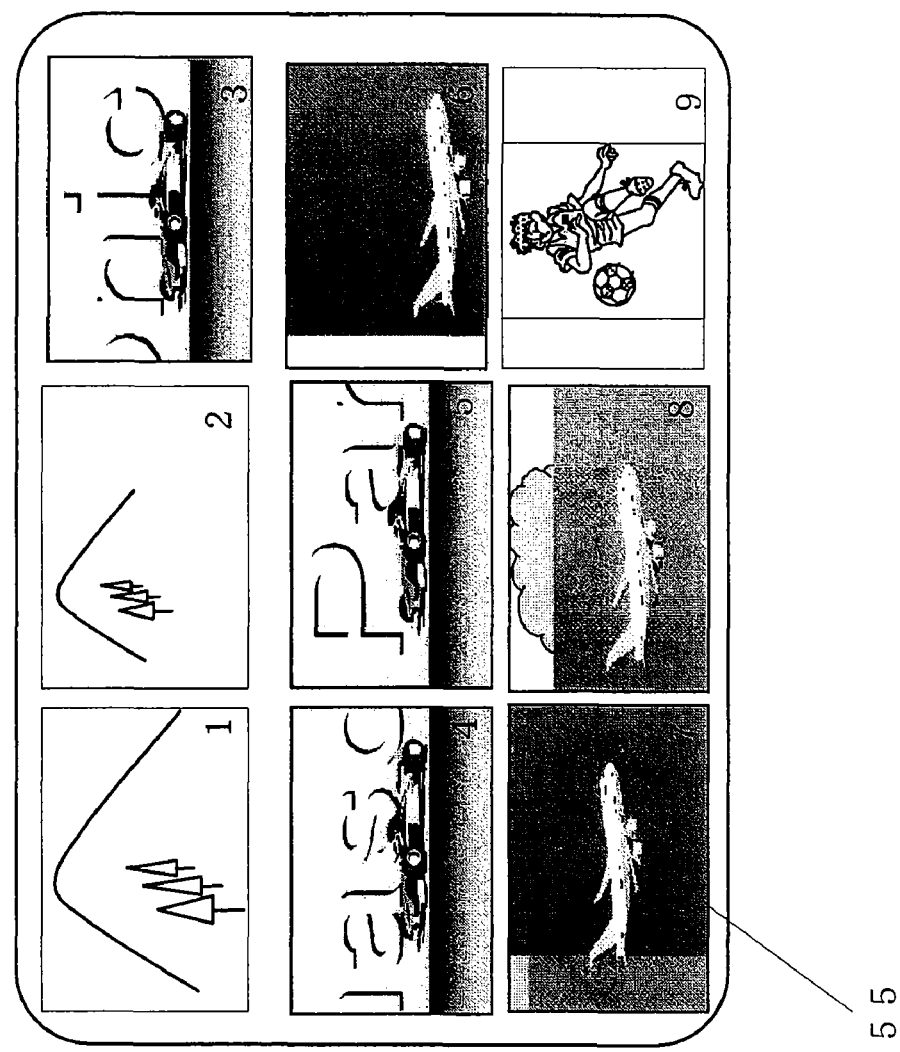
FIG. 12 is a diagram showing an example of a thumbnail display of shot images in the digital camera shown in FIG. 1.

FIG. 12 shows an exemplary case where shot images are displayed in thumbnailed form on the display section 55 in order of shooting date and time. On the display section 55, a list of nine thumbnail images, from number 1 to number 9, are displayed. Numbers 1, 2, and 9 are thumbnail images of images shot in the normal mode, numbers 1 and 2 are thumbnail images horizontally shot, and number 9 is a thumbnail image vertically shot. Numbers 3 to 5 and numbers 6 to 8 are images each shot in the consecutive shooting mode. As above described, the horizontally shot images are recorded with 0 which is the attitude determination signal 61 added thereto and indicates that the shooting attitude is rotated about the optical axis AX by 0 degrees from the horizontal shooting attitude.

Therefore, the horizontal thumbnail images are displayed in a state of the horizontal shooting attitude in accordance with the attitude determination signal 61. On the other hand, the vertical thumbnail images of number 9 are recorded with 1 which is the attitude determination signal 61 added thereto and indicates that the shooting attitude is rotated about the optical axis AX by 90 degrees from the horizontal shooting attitude. Therefore, the vertical thumbnail images are rotated about the optical axis AX by 90 degrees with respect to the horizontal thumbnail image and then displayed in accordance with this attitude determination signal 61. When each of the thumbnail images is selected from among these thumbnail images by using the cross operation key 38, the each of the shot images may be enlarged one by one.

Figure 13:
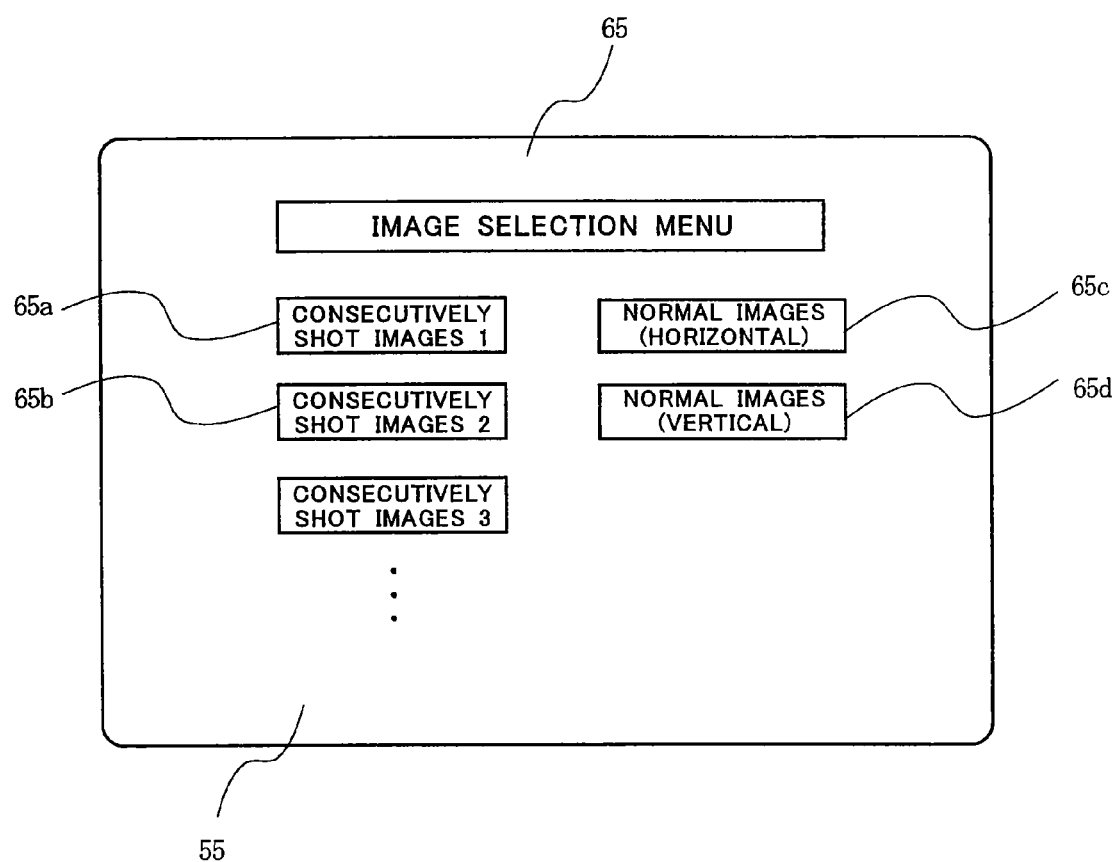
FIG. 13 is a diagram illustrating an image selection menu displayed on a display section of the digital camera shown in FIG. 1.
Figure 14:
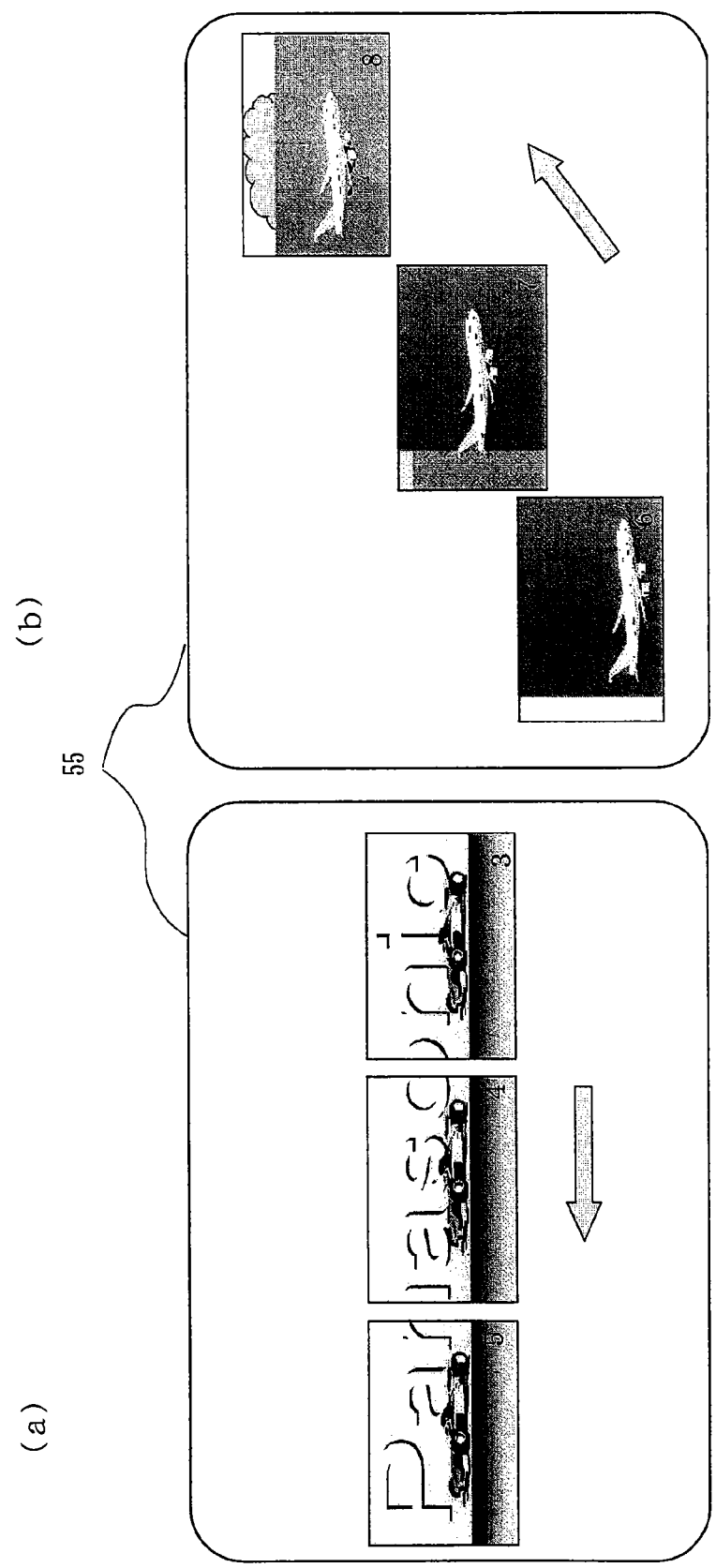
FIG. 14 is a diagram illustrating a case where only consecutively shot images are displayed in thumbnailed form on the display section of the digital camera shown in FIG. 1.
Figure 15:
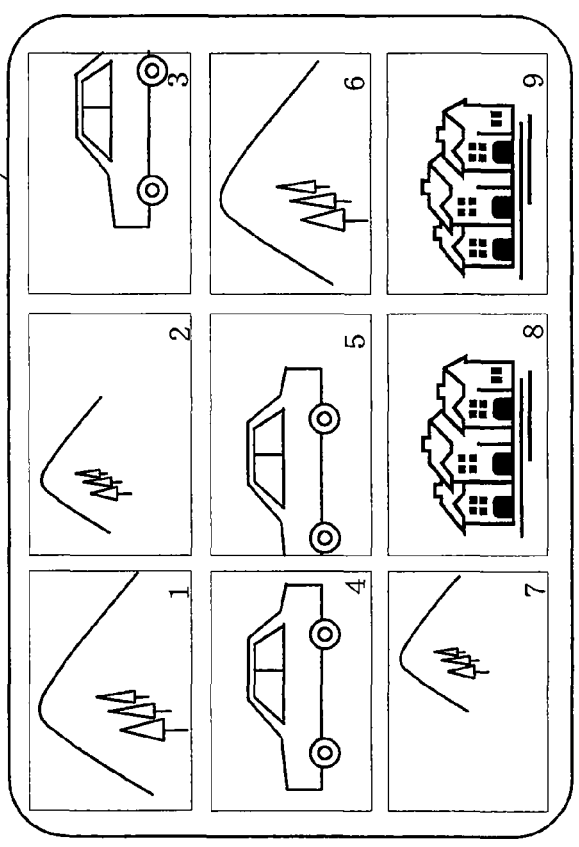
FIG. 15 is a diagram illustrating a case where only horizontally shot images or only vertically shot images are displayed in thumbnailed form on the display section of the digital camera shown in FIG. 15.
Figure 15:
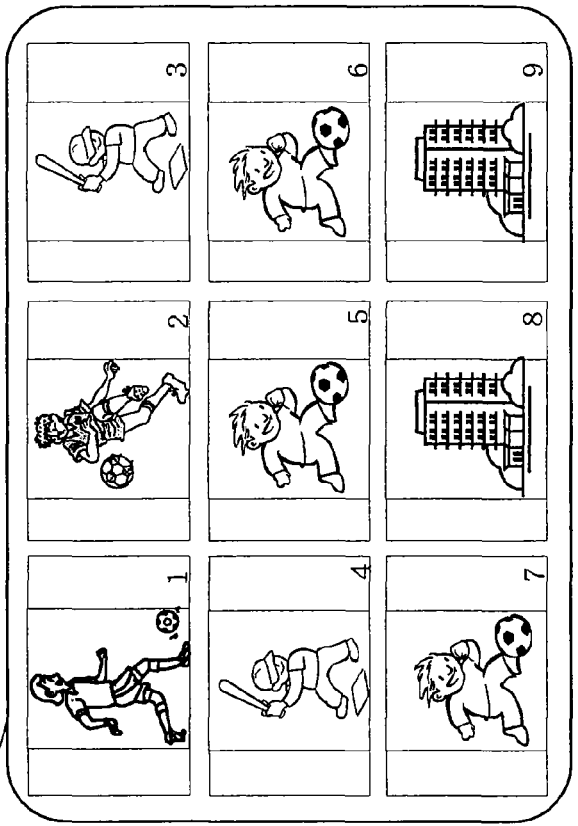

Next, with reference to FIGS. 13, 14, and 15, a method for displaying only the consecutively shot images, or only the horizontally shot images, or only the vertically shot images on the display section 55 in thumbnailed form will be described. FIG. 13 shows an exemplary image selection menu displayed on the display section 55, FIG. 14 shows the display section 55 in the case where only consecutively shot images having been selected are displayed thereon, and FIG. 15 shows the display section 55 in the case where only the horizontally shot images or only the vertically shot images are displayed thereon in thumbnailed form. After the shooting/reproduction switching operation section 37 is turned to the reproduction mode, when the user presses the MENU setting operation section 39, the image selection menu 65 is displayed on the display section 55.

In the case where only the consecutively shot images 1 are to be displayed, the user selects a selection button 65*a* for selecting the consecutively shot images 1, whereby the microcomputer 3 and the image display control section 13 extract only the images in the consecutively shot image folder #1 which is created in a hierarchy under the shot image folder 90. The extracted images are displayed on the display section 55 each at an appropriate angle in accordance with attitude and panning mode information recorded together therewith.

FIG. 14(*a*) shows an exemplary display of consecutively shot images 1 which are consecutively shot through panning from the right to the left in a state of the horizontal attitude. In the same example, the attitude determination signal 61 is recorded as (0), and the panning mode signal 60 is recorded as (2). As a result, the consecutively shot images are arranged from the right to the left.

FIG. 14(*b*) shows an exemplary display of consecutively shot images 2 which are consecutively shot through diagonal panning toward the upper right in a state of the horizontal attitude. In the same example, the attitude determination signal 61 is recorded as (0), and the panning mode signal 60 is recorded as (4). As a result, the consecutively shot images are arranged diagonally from the bottom left to the upper right. In this manner, it is possible to realize an easily viewable thumbnail display which corresponds to an actual shooting scene.

In the case where only the horizontally shot images are to be displayed, in response to the user's pressing of the horizontal image selection button 65*c*, the microcomputer 3 and the image display control section 13 extract only those images in the horizontal image folder 93*a* which is created in the hierarchy under the shot image folder 90, and cause the display section 55 to display the horizontal thumbnail images in order of extraction. As a result, as shown in FIG. 15(*a*), only the horizontal thumbnail images are displayed on the display section 55.

On the other hand, in the case where only the shot images in the vertical shooting attitude are to be displayed, in response to the user's pressing of the vertical image selection button 65*d*, the microcomputer 3 and the image display control section 13 extract images which are shot in the vertical shooting attitude and stored in the vertical image folder 93*b* which is created in the hierarchy under the shot image folder 90, and cause the vertical thumbnail images to be displayed on the display section 55 in order of extraction. As a result, as shown in FIG. 15(*b*), only the vertical thumbnail images are displayed on the display section 55.

As above described, with respect to each of consecutive shooting operations or each of shooting attitudes, the digital camera 1 stores shot images in the folders which are created for the each of consecutive shooting operations and for the each of the shooting attitudes. Accordingly, it is possible to easily extract only the consecutively shot images, or only the horizontally shot images, or only the vertically shot images. In the case where the consecutively shot images are displayed, the shot images are arranged in a manner corresponding to the motion of the digital camera 1 during shooting and displayed on the display section 55.

During the consecutive shooting, The shooting attitude and the panning mode of the digital camera 1 according to embodiment 1 are detected by the image blurring compensation mechanism 20. Then, the attitude determination signal 61 corresponding to each attitude, and the panning mode signal 60 corresponding to each mode are recorded together with each of the consecutively shot images. The normally shot images are separated into each of the shooting attitudes in accordance with the attitude determination signal 61, and then recorded.

Further, when the shot images are reproduced, by using the image selection means (the image selection menu 65, the horizontal image selection button 65*c*, and the vertical image selection button 65*d*), the images which have been shot in a given consecutive shooting operation or have been shot in a given attitude are extracted. Further, on the display section 55, images which have been shot in the same consecutive shooting operation or have been shot in the same shooting attitude can be displayed. Accordingly, the consecutively shot images are not mixed with vertical and horizontal shot images and are arranged in a manner corresponding to a motion during the shooting, whereby it is possible to provided the photographer with a convenient thumbnail display.

In the present embodiment, although an angular velocity signal from the angular velocity sensor is used for detecting the panning mode, a signal outputted from a pitching or a yawing control section may be used.

In the present embodiment, in the case where the attitude of the digital camera is detected by using the image blurring compensation mechanism, there may be a case where currents supplied to a coil in the yawing direction and to a coil in the pitching direction become equal to each other when the digital camera is held in some attitudes. For example, there are a case where shooting is performed by the photographer in an attitude in which the optical axis direction of the digital camera and the gravity direction are parallel with each other, and a case where the shooting is performed in an attitude in which, although the optical axis direction of the digital camera and the gravity direction are perpendicular to each other, the digital camera is rotated about the optical axis AX within a predetermined range, or the like. As described, in the case where the attitude is not detected by the image blurring compensation device, the shot images may be regarded as being shot in the horizontal shooting attitude, and accordingly each have a value 1 of the attitude determination signal 61 added thereto. Alternatively, based on a setting by the photographer, the shot images may be regarded as being shot in the vertical shooting attitude, and accordingly each have a value 0 of the attitude determination signal 61 added thereto.

In the present embodiment, although the shooting attitude is determined by detecting both current values of the pitching current value detection section and the yawing current value detection section, the shooting attitude can be specified by detecting at least one of the current values. Accordingly, as described in the present embodiment, even in the case where either of the pitching current value detection section or the yawing current value detection section malfunctions, the shooting attitude can be determined accurately since both of the current values are detected.

As above described, the shooting attitude may be determined not only based on the current values detected by the pitching current value detection section and/or the yawing current value detection section. For example, a similar effect can be obtained through measurement of voltage values.

Embodiment 2

Figure 16:
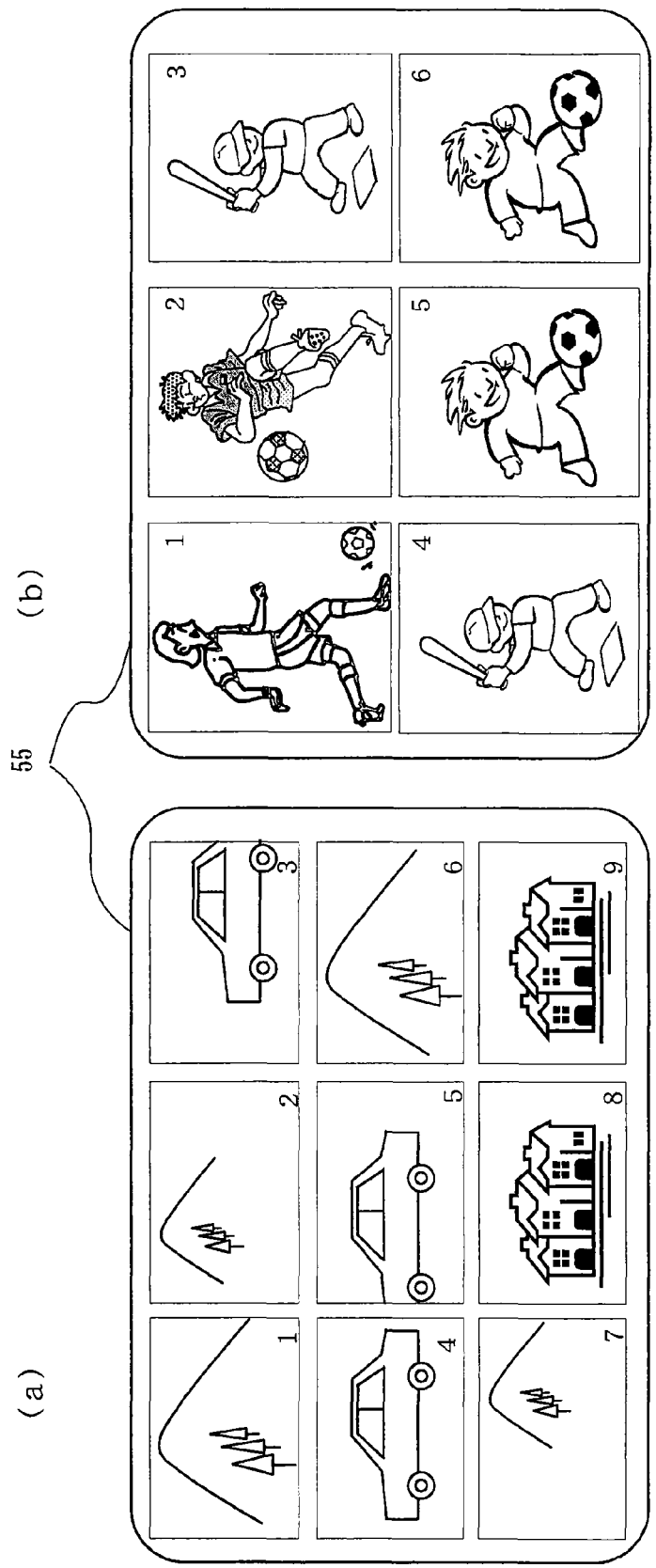
FIG. 16 is a diagram illustrating a case where thumbnail images are displayed on a display section of a digital camera, which is an imaging device according to embodiment 2 of the present invention.
Figure 17:
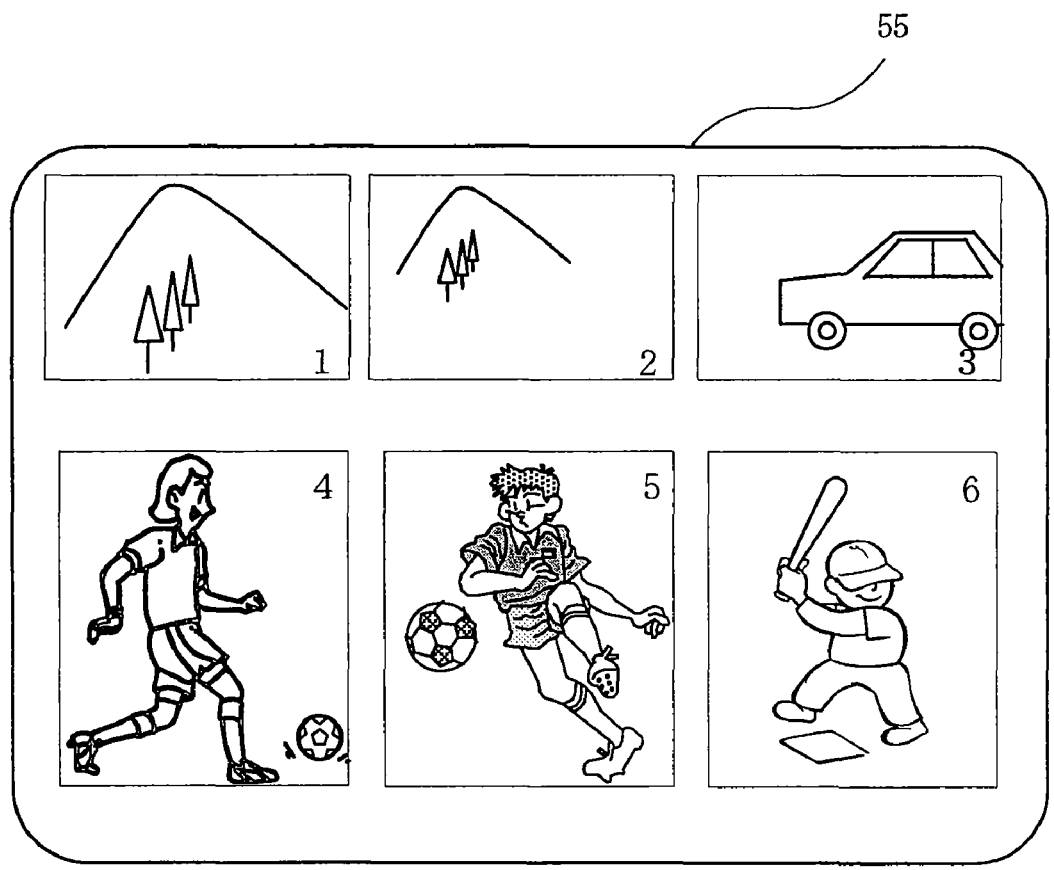
FIG. 17 is a diagram illustrating a case where vertical thumbnail images and horizontal thumbnail images are displayed, in a mixed manner, on the display section according to embodiment 2 of the present invention.

With reference to FIGS. 16 and 17, an imaging device according to embodiment 2 of the present invention will be described. The imaging device according to the present embodiment (not shown) is configured approximately in the same manner as the digital camera 1 according to embodiment 1. Therefore, those points which are different from the digital camera 1 according to embodiment 1 will be described specifically.

As shown in FIG. 16(*a*), in the imaging device according to the present embodiment, in the case where images shot in a horizontal shooting attitude are thumbnail-displayed, a list of nine thumbnail images is displayed on a display section 55. On the other hand, in the case where images shot in the vertical shooting attitude are displayed in thumbnailed form, a list of six thumbnail images is displayed on the display section 55, as shown in FIG. 16(*b*). Therefore, in a vertical direction of the display section 55, three horizontal thumbnail images or two vertical thumbnail images are displayed. In a horizontal direction of the display section 55, three horizontal thumbnail images or three vertical thumbnail images are displayed.

In this manner, the number of the vertical thumbnail images displayed on the display section 55 (hereinafter referred to as the "number of displayed images") is lower than the number of displayed horizontal thumbnail images. Accordingly, it is possible to display vertical thumbnail images at a larger size than a conventional size of the vertical thumbnail image. Further, when the thumbnail images are displayed in an enlarged manner, black bars displayed on the left and right of each of the thumbnail images can be removed, whereby an easily viewable and convenient thumbnail display can be provided.

Next, a method for displaying the shot images in thumbnailed form, according to the present embodiment, will be described. First, a user turns a shooting/reproduction switching operation section 37 of the digital camera 1 to a reproduction mode, and then presses a MENU setting operation section 39. At the result, an image selection menu 65 as shown in FIG. 13 is displayed on the display section 55. In the case where only the shot images which are in the horizontal shooting attitude are to be displayed, the user selects and operates the horizontal image selection button 65*c*. A microcomputer 3 and an image display control section 13 extract images in a horizontal image folder 93*a* which is in a hierarchy under a shot image folder 90, and cause respective thumbnail images to be displayed on the display section 55 in order of extraction. In this case, the image display control section 13 controls the display such that a list of nine thumbnail images is to be displayed on the display section 55.

On the other hand, in the case where only the shot images which are in the vertical shooting attitude are to be displayed, the user selects and operates the vertically oriented image selection button 65*d*. The microcomputer 3 and the image display control section 13 extract images in the vertical image folder 93*b* which is in the hierarchy under the shot image folder 90, and cause respective thumbnail images to be displayed on the display section 55 in order of extraction. In this case, the image display control section 13 controls the display such that a list of six thumbnail images is to be displayed on the display section 55.

As above described, the imaging device according to the present embodiment not only attains the effects obtained by the imaging device according to embodiment 1 but also reduces, based on the control by the image display control section 13, the number of thumbnail images to be displayed on the display section 55, compared to the number of the thumbnail images of the shot images which are shot in the horizontal shooting attitude, when the shot images which have been shot in the vertical shooting attitude are displayed in thumbnailed form. Therefore, it is possible to display the images shot in the vertical attitude in a convenient manner.

Further, even in the case where the vertical thumbnail images and the horizontal thumbnail images are mixed, a horizontal display range of the vertically shot image can be increased to be approximately equal to that of the horizontally shot images, as shown in FIG. 17. Since a display size of the vertical thumbnail images can be increased with respect to a size of the horizontal thumbnail images, it is possible to provide an easily viewable and convenient thumbnail display.

Embodiment 3

Figure 18:
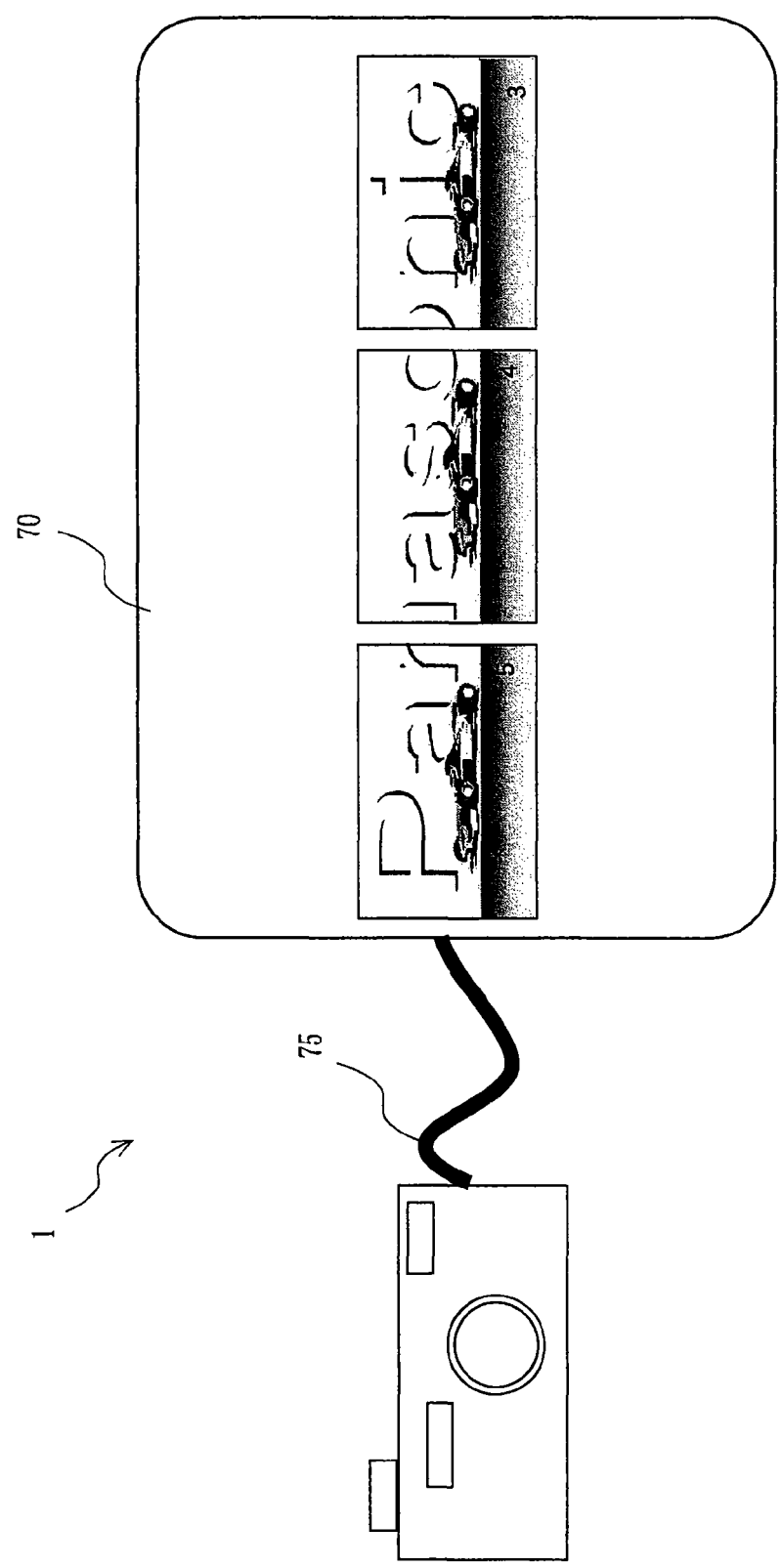
FIG. 18 is a diagram showing an imaging device and a display device according to embodiment 3 of the present invention.

With reference to FIG. 18, an imaging device according to embodiment 3 of the present invention will be described. The imaging device according to the present embodiment (not shown) is configured approximately in the same manner as the digital camera 1, which is an imaging device according to each of embodiment 1 and embodiment 2. However, the imaging device according to the present embodiment is different from those according to embodiment 1 and embodiment 2 in that the imaging device according to the present embodiment causes, based on attitude information at the time of shooting, an external display device which is connected to the imaging device to display a shot image and a reduced image.

Specifically, as shown in FIG. 18, the shot images which are recorded in an image recording section of the digital camera 1 together with the attitude information and panning mode information are displayed on a display device 70 such as a television monitor via a cable 75. As the cable 75, a USB (Universal Serial Bus) cable may be used. Images displayed on the display device 70 are controlled by the image display control section 13 of the digital camera 1. Thus, the images, in which respective angles at the time of shooting are restored, and thumbnail images thereof can be displayed on the external display device in a manner similar to those of embodiment 1 and embodiment 2.

As above described, in the case where the display section 55 is not provided to the digital camera 1, or in the case where a display size of the shot image is to be enlarged, with an operation of the digital camera 1, an image having an attitude and a panning mode at the time of shooting reflected thereon can be displayed on the external television monitor or the like in a manner similar to those of embodiment 1 and embodiment 2. Therefore, it is possible to provide a highly convenient imaging device and a display device, which allows an easily viewable and convenient thumbnail display.

In the present embodiment, the external display device is exemplified by the television monitor, but is not limited thereto. For example, the imaging device may be connected to a personal computer having a monitor connected thereto via a cable and cause the monitor to display the shot image.

In the present embodiment, the cable 75 is exemplified by the USB cable, but is not limited thereto. For example, an IEEE1394 serial bus cable may be used instead of the cable 75. Wireless connection such as a wireless LAN or the like may be adopted.

Embodiment 4

Figure 19:
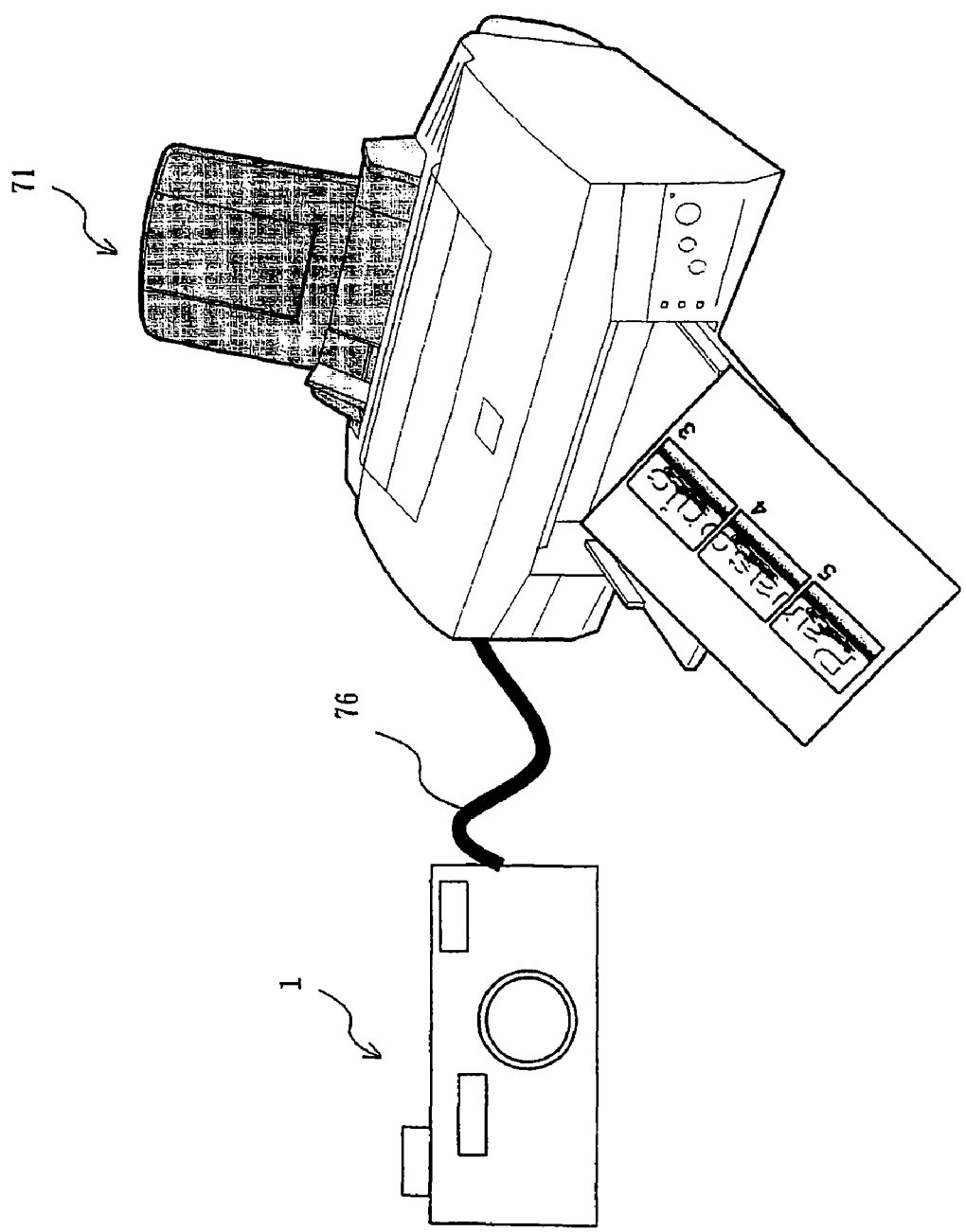
FIG. 19 is a diagram showing an imaging device and a printing device according to embodiment 4 of the present invention.

With reference to FIG. 19, an imaging device and a printing device according to embodiment 4 of the present invention will be described. The imaging device according to the present embodiment (not shown) is configured approximately in the same manner as the digital camera 1 according to each of embodiment 1 and embodiment 2. However, the imaging device according to the present embodiment is different from those according to embodiment 1 and embodiment 2 in that the imaging device according to the present embodiment causes, based on attitude information at the time of shooting, an external printing device connected to the imaging device to print a shot image and a reduced image. As shown in FIG. 18, the shot image recorded in an image recording section 12 of the digital camera 1 together with the attitude information and panning mode information is transmitted to a printing device 71 via a cable 76 and then printed. As the cable 76, a USB (Universal Serial Bus) cable is used as an example. Since an image printed by the printing device 71 is controlled by the image display control section 13 in a manner similar to those of embodiment 1 and embodiment 2, an image in which an attitude at the time of shooting is restored and a thumbnail image thereof can be printed through an external printing device.

According to the above-described configuration, a user operates the digital camera 1 to reflect the attitude and the panning mode at the time of shooting on the image in a manner similar to those of embodiment 1 and embodiment 2. Since the reflected image can be printed, it is possible to provide a highly convenient imaging device and a printing device which allows an easily viewable and convenient thumbnail printing.

In the present embodiment, the external printing device is exemplified by an example of a printer directly connected, but is not limited thereto. For example, the imaging device may be connected to a personal computer having a printer connected thereto via a cable.

In the present embodiment, the cable 76 is exemplified by the USB cable, but is not limited thereto. For example, an IEEE1394 serial bus cable may be used instead of the cable 75. Wireless connection such as a wireless LAN or the like may be adopted.

Embodiment 5

Figure 20:
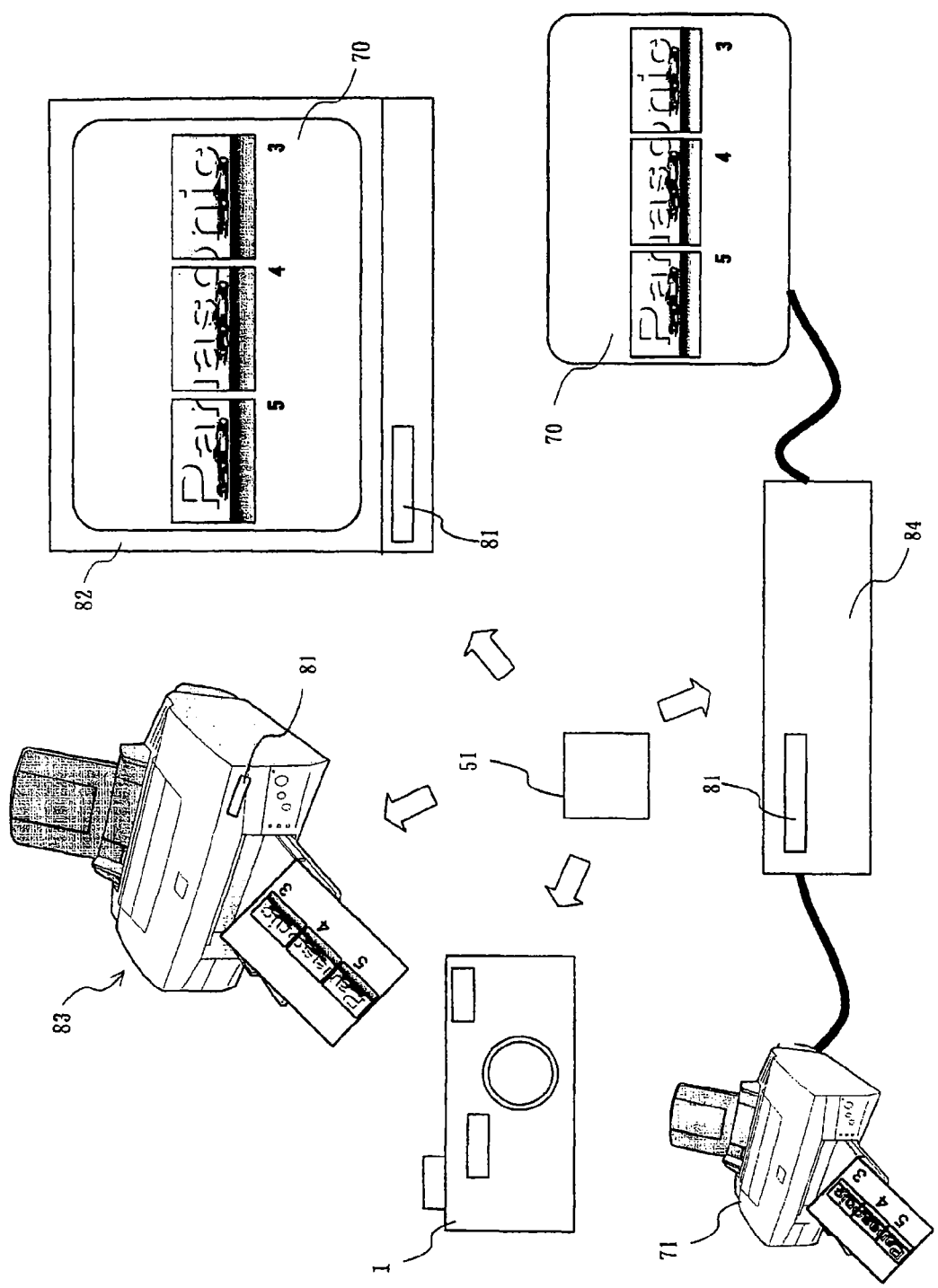
FIG. 20 is a diagram showing a display control device, a print control device, and a display/print control device according to embodiment 5 of the present invention.

With reference to FIG. 20, a display control device, a print control device, and a display/print control device according to embodiment 5 of the present invention will be described. A digital camera 1 according to the present embodiment is configured approximately in the same manner as those according to embodiment 1 and embodiment 2. However, in the present embodiment, a display control, which is performed by the digital camera 1 in each of above-described embodiment 1 and embodiment 2, is performed by a display control device 82. The display control device 82 is realized by a personal computer having image processing software, monitor, and the like, for example. An image shot by the digital camera 1 is recorded together with a reduced image and attitude information in a removable memory 51 such as a detachable memory card.

The removable memory 51 is not limited to the memory card, but may be a hard disc, an optical disc, and the like. The shot image is displayed on the display control device 82 which includes a removable memory reading device 81 operable to read the removable memory 51 and a display device 70. Display of an image to be displayed on the display device is controlled by the display control device 82, in a manner similar to those of embodiment 1 and embodiment 2, in accordance with the attitude information and panning mode information recorded in the removable memory 51.

According to the above-described configuration, the display control device 82 according to the present embodiment reads a shot image, a reduced image, and the attitude information, which are obtained by the digital camera 1, from the removable memory 51 storing these images and information. The display control device 82 then displays, on a display device, an image having the attitude and the panning mode information at the time of shooting reflected thereon and a thumbnail image thereof in accordance with the attitude information, which are described in embodiment 1 and embodiment 2.

As shown in FIG. 20, even in the case where the shot image is printed through the print control device 83 having the removable memory reading device 81, or even in the case where the display/print control device 84 is connected to the display device 70 for displaying, or connected to the printing device 71 for printing, a similar effect can be obtained.

The present embodiment is exemplified by a case where the display device having the removable memory reading device

81, the printing device, and the display/print control device are used, but is not limited thereto. For example, a reading device such as a memory card reader or the like which is operable to read the removable memory 51, the display/print control device, the display device, and the printing device may be connected to one another.

Embodiment 1 to embodiment 3 exemplify a case where the reduced image is used for a thumbnail display, but are not limited thereto. For example, the reduced image may be used for a display on a split screen which is obtained by dividing a screen of the display section into two or three. As a result, it is possible to provide a convenient reduced image display and a split screen display in the same manner as the thumbnail display.

Embodiment 1 to embodiment 3 exemplify a case where the image blurring compensation mechanism 20 is used as means for the attitude detection and for the panning mode detection, but are not limited thereto. For example, an angular sensor, a rotation detection device, or the like may be coupled to the digital camera 1, whereby it may be possible to detect the shooting attitude of the digital camera 1.

Embodiment 1 to embodiment 3 exemplify a case where the imaging device having one shutter operation section 36 is used, but are not limited thereto. For example, a shutter operation section for shooting in the horizontal shooting attitude, and a shutter operation section for shooting in the vertical shooting attitude are separately provided, and the shooting attitude may be determined based on the used shutter operation sections.

Embodiment 1 to embodiment 3 exemplify a case where an shooting attitude which is rotated about the optical axis AX by 90 degrees from the horizontal shooting attitude, which is set as 0 degree, is regarded as the vertical shooting attitude. However, a similar effect may be obtained in the case where an attitude is rotated by −90 degrees. Further, a value of the attitude determination signal 61 for the attitude which is rotated by −90 degrees is set to 2, whereby it may be possible to detect total of three types of attitudes, i.e., one type of the horizontal attitude and two types of the vertical attitudes.

Embodiment 1 to embodiment 3 exemplify a case where the signal 0 or 1 is added, as the value of the attitude determination signal 61, but are not limited thereto. For example, a signal may be added only in the case of the vertical shooting attitude may be adopted. Further, instead of a method in which the attitude determination signal 61 is recorded in the shot image, a method, in which the attitude determination signal 61 is recorded in a file different from the shot image, and the shot image and the file having recording the attitude determination signal 61 are interrelated with each other, may be adopted.

INDUSTRIAL APPLICABILITY

An imaging device, a display control device, and a display device of the present invention are applicable to a digital still camera, a digital video camera, a camera-equipped cellular phone or PDA, a DVD recorder, hard disc recorder, and the like which are all required for a convenient display relating to a method for displaying a shot image.

The invention claimed is:

1. An imaging device operable to output an optical image of an object as an electrical image signal, the imaging device comprising:
    a display unit for displaying an image in accordance with the electrical image signal;
    an imaging optical system for forming the optical image of the object;
    an imaging unit for receiving the optical image which is formed by the imaging optical system and for converting the optical image into the electrical image signal;
    a motion detection unit for detecting a motion of the imaging device during consecutive shooting;
    a recording unit for recording shot images obtained by the imaging unit, reduced images of the shot images, and motion information indicating the motion of the imaging device, which has been detected by the motion detection unit, for each of the reduced images, wherein the shot images, the reduced images, and the motion information are related with one another;
    an image extraction unit for extracting a plurality of reduced images of the consecutive shooting from among the reduced images recorded in the recording unit;
    an image display control unit for causing the display unit to display the plurality of reduced images extracted by the image extraction unit; and
    an attitude detection unit for detecting a shooting attitude of the imaging device, wherein:
    the image display control unit arranges the plurality of reduced images extracted by the image extraction unit in accordance with the motion information and causes the display unit to display the plurality of reduced images extracted by the image extraction unit,
    the recording unit records attitude information indicating an attitude of the imaging device for each of the reduced images, recorded by the recording unit, of the consecutive shooting, and
    the image display control unit restores respective angles of the plurality of reduced images extracted by the image extraction unit to angles corresponding to shooting attitudes of the imaging device in accordance with the attitude information, and causes the display unit to display restored reduced images.

2. The imaging device according to claim 1, wherein the image display control unit controls the number of the reduced images of the consecutive shooting, which are to be displayed, in accordance with the motion information or the attitude information.

3. The imaging device according to claim 1, further comprising
    a recording control unit for storing the reduced images of the consecutive shooting in a common folder in the recording unit.

4. The imaging device according to claim 1, further comprising
    an image blurring compensation unit for detecting vibration applied to the imaging optical system, and driving a compensation lens of the imaging optical system in two directions respectively perpendicular to an optical axis thereof, wherein
    the motion detection unit determines the motion in accordance with a signal from an angular velocity detection device for detecting vibration.

5. The imaging device according to claim 1, further comprising
    an image blurring compensation unit for detecting vibration applied to the imaging optical system, and driving a compensation lens of the imaging optical system in two directions respectively perpendicular to an optical axis thereof, wherein
    the motion detection unit determines the motion by detecting a signal for driving the compensation lens.

6. The imaging device according to claim 5, wherein the image blurring compensation unit includes a first actuator and a second actuator for driving the compensation lens in the two directions respectively perpendicular to the optical axis thereof, and the motion detection unit determines the motion by detecting a value of a driving current of at least one of the first actuator and the second actuator.

7. An imaging device which is operable to output an optical image of an object as an electrical image signal, and is connectable to a display unit, the imaging device comprising:

an imaging optical system for forming the optical image of the object;

an imaging unit for receiving the optical image which is formed by the imaging optical system and for converting the optical image into the electrical image signal;

a motion detection unit for detecting a motion of the imaging device during consecutive shooting;

a recording unit for recording shot images, reduced images of the shot images, and motion information indicating the motion of the imaging device, which has been detected by the motion detection unit, for each of the reduced images, wherein the shot images, the reduced images and the motion information are related with one another;

an image extraction unit for extracting a plurality of reduced images of the consecutive shooting from among the reduced images recorded in the recording unit;

an image display control unit for generating a control signal for controlling display of the plurality of reduced images extracted by the image extraction unit;

an output unit for providing the control signal and the reduced images to the display unit and an attitude detection unit for detecting a shooting attitude of the imaging device, wherein:

the control signal includes a signal for causing the display unit to arrange and display the extracted reduced images in accordance with the motion information, the recording unit records attitude information indicating attitudes of the imaging device for each of the reduced images of the consecutive shooting, and the image display control unit restores respective angles of the plurality of reduced images extracted by the image extraction unit to angles correspond to shooting attitudes of the imaging device in accordance with the attitude information, and causes the display unit to display restored reduced images.

8. The imaging device according to claim 7, wherein the image display control unit controls the number of the reduced images of the consecutive shooting, which are to be displayed, in accordance with the motion information or the attitude information.

9. The imaging device according to claim 7, further comprising a recording control unit for storing the reduced images of the consecutive shooting in a common folder in the recording unit.

10. The imaging device according to claim 7, further comprising an image blurring compensation unit for detecting vibration applied to the imaging optical system, and driving a compensation lens of the imaging optical system in two directions respectively perpendicular to an optical axis thereof, wherein the motion detection unit determines the motion in accordance with a signal from an angular velocity detection device for detecting vibration.

11. The imaging device according to claim 7, further comprising an image blurring compensation unit for detecting vibration applied to the imaging optical system, and driving a compensation lens of the imaging optical system in two directions respectively perpendicular to an optical axis thereof, wherein the motion detection unit determines the motion by detecting a signal for driving the compensation lens.

12. The imaging device according to claim 11, wherein the image blurring compensation unit includes a first actuator and a second actuator for driving the compensation lens in the two directions respectively perpendicular to the optical axis thereof, and the motion detection unit determines the motion by detecting a value of a driving current of at least one of the first actuator and the second actuator.

13. The imaging device according to claim 1, wherein the image display control unit arranges the plurality of reduced images of the consecutive shooting extracted by the image extraction unit in a direction of the imaging device movement during the consecutive shooting.

14. The imaging device according to claim 7, wherein the control signal causes the display unit to arrange the plurality of reduced images of the consecutive shooting extracted by the image extraction unit in a direction of the imaging device movement during the consecutive shooting.

* * * * *